United States Patent
Joshi et al.

(10) Patent No.: US 8,874,823 B2
(45) Date of Patent: Oct. 28, 2014

(54) SYSTEMS AND METHODS FOR MANAGING DATA INPUT/OUTPUT OPERATIONS

(75) Inventors: Vikram Joshi, Los Gatos, CA (US); Yang Luan, San Jose, CA (US); Manish R. Apte, San Jose, CA (US); Hrishikesh A. Vidwans, San Jose, CA (US); Michael F. Brown, Arlington, MA (US)

(73) Assignee: Intellectual Property Holdings 2 LLC, Wilmington, DE (US)

( * ) Notice: Subject to any disclaimer, the term of this patent is extended or adjusted under 35 U.S.C. 154(b) by 622 days.

(21) Appl. No.: 13/028,149

(22) Filed: Feb. 15, 2011

(65) Prior Publication Data
US 2012/0210043 A1    Aug. 16, 2012

(51) Int. Cl.
G06F 21/00    (2013.01)
G06F 13/00    (2006.01)
G06F 13/28    (2006.01)
G06F 9/455    (2006.01)
G06F 12/08    (2006.01)

(52) U.S. Cl.
CPC ............ *G06F 9/455* (2013.01); *G06F 12/0802* (2013.01)
USPC ........................ 711/6; 711/138; 711/E12.016

(58) Field of Classification Search
None
See application file for complete search history.

(56) References Cited

U.S. PATENT DOCUMENTS

| | | |
|---|---|---|
| 4,571,674 A | 2/1986 | Hartung |
| 5,043,871 A | 8/1991 | Nishigaki et al. |
| 5,193,184 A | 3/1993 | Belsan et al. |
| 5,261,068 A | 11/1993 | Gaskins et al. |
| 5,291,496 A | 3/1994 | Andaleon et al. |
| 5,307,497 A | 4/1994 | Feigenbaum |
| 5,313,475 A | 5/1994 | Cromer et al. |
| 5,325,509 A | 6/1994 | Lautzenheiser |
| 5,392,427 A | 2/1995 | Barrett et al. |
| 5,404,485 A | 4/1995 | Ban |
| 5,434,994 A | 7/1995 | Shaheen et al. |
| 5,438,671 A | 8/1995 | Miles |
| 5,469,555 A | 11/1995 | Ghosh et al. |
| 5,499,354 A | 3/1996 | Aschoff et al. |
| 5,504,882 A | 4/1996 | Chai |

(Continued)

FOREIGN PATENT DOCUMENTS

| | | |
|---|---|---|
| CN | 1771495 | 5/2006 |
| EP | 1100001 | 5/2001 |

(Continued)

OTHER PUBLICATIONS

Albert Noll et al., CellVM: A Homogeneous Virtual Machine Runtime System for a Heterogeneous Single-Chip Multiprocessor; *Technical Report No. 06-17, Donald Bren School of Information and Computer Science*, University of California, Irvine; Nov. 2006.

(Continued)

*Primary Examiner* — Eric S Cardwell
(74) *Attorney, Agent, or Firm* — Stoel Rives LLP

(57) ABSTRACT

Systems and methods for managing data input/output operations are described. In one aspect, a device driver identifies a data read operation generated by a virtual machine in a virtual environment. The device driver is located in the virtual machine and the data read operation identifies a physical cache address associated with the data requested in the data read operation. A determination is made regarding whether data associated with the data read operation is available in a cache associated with the virtual machine.

31 Claims, 13 Drawing Sheets

(56) References Cited

U.S. PATENT DOCUMENTS

| | | |
|---|---|---|
| 5,535,399 A | 7/1996 | Blitz et al. |
| 5,551,003 A | 8/1996 | Mattson et al. |
| 5,553,261 A | 9/1996 | Hasbun et al. |
| 5,559,988 A | 9/1996 | Durante et al. |
| 5,586,291 A | 12/1996 | Lasker et al. |
| 5,594,883 A | 1/1997 | Pricer |
| 5,596,736 A | 1/1997 | Kerns |
| 5,598,370 A | 1/1997 | Nijima et al. |
| 5,603,001 A | 2/1997 | Sukegawa et al. |
| 5,651,133 A | 7/1997 | Burkes |
| 5,680,579 A | 10/1997 | Young et al. |
| 5,682,497 A | 10/1997 | Robinson |
| 5,682,499 A | 10/1997 | Bakke et al. |
| 5,701,434 A | 12/1997 | Nakagawa |
| 5,734,861 A | 3/1998 | Cohn et al. |
| 5,740,367 A | 4/1998 | Spilo |
| 5,745,792 A | 4/1998 | Jost |
| 5,754,563 A | 5/1998 | White |
| 5,757,567 A | 5/1998 | Hetzler et al. |
| 5,787,486 A | 7/1998 | Chin et al. |
| 5,802,602 A | 9/1998 | Rahman et al. |
| 5,809,527 A | 9/1998 | Cooper et al. |
| 5,809,543 A | 9/1998 | Byers et al. |
| 5,845,313 A | 12/1998 | Estakhri et al. |
| 5,845,329 A | 12/1998 | Onishi et al. |
| 5,860,083 A | 1/1999 | Sukegawa |
| 5,907,856 A | 5/1999 | Estakhri et al. |
| 5,924,113 A | 7/1999 | Estakhri et al. |
| 5,930,815 A | 7/1999 | Estakhri et al. |
| 5,957,158 A | 9/1999 | Volz et al. |
| 5,960,462 A | 9/1999 | Solomon et al. |
| 5,961,660 A | 10/1999 | Capps, Jr. et al. |
| 6,000,019 A | 12/1999 | Dykstal et al. |
| 6,014,724 A | 1/2000 | Jenett |
| 6,073,232 A | 6/2000 | Kroeker et al. |
| 6,075,938 A | 6/2000 | Bugnion et al. |
| 6,101,601 A | 8/2000 | Matthews et al. |
| 6,115,703 A | 9/2000 | Bireley et al. |
| 6,128,695 A | 10/2000 | Estakhri et al. |
| 6,141,249 A | 10/2000 | Estakhri et al. |
| 6,145,051 A | 11/2000 | Estakhri et al. |
| 6,170,039 B1 | 1/2001 | Kishida |
| 6,170,047 B1 | 1/2001 | Dye |
| 6,172,906 B1 | 1/2001 | Estakhri et al. |
| 6,173,381 B1 | 1/2001 | Dye |
| 6,185,654 B1 | 2/2001 | Van Doren |
| 6,209,088 B1 | 3/2001 | Reneris |
| 6,223,308 B1 | 4/2001 | Estakhri et al. |
| 6,230,234 B1 | 5/2001 | Estakhri et al. |
| 6,236,593 B1 | 5/2001 | Hong et al. |
| 6,240,040 B1 | 5/2001 | Akaogi et al. |
| 6,256,642 B1 | 7/2001 | Krueger et al. |
| 6,266,785 B1 | 7/2001 | McDowell |
| 6,279,069 B1 | 8/2001 | Robinson et al. |
| 6,289,413 B1 | 9/2001 | Rogers et al. |
| 6,330,688 B1 | 12/2001 | Brown |
| 6,336,174 B1 | 1/2002 | Li et al. |
| 6,356,986 B1 | 3/2002 | Solomon et al. |
| 6,370,631 B1 | 4/2002 | Dye |
| 6,385,710 B1 | 5/2002 | Goldman et al. |
| 6,393,513 B2 | 5/2002 | Estakhri et al. |
| 6,404,647 B1 | 6/2002 | Minne |
| 6,412,080 B1 | 6/2002 | Fleming et al. |
| 6,418,478 B1 | 7/2002 | Ignatius et al. |
| 6,507,883 B1 | 1/2003 | Bello et al. |
| 6,507,911 B1 | 1/2003 | Langford |
| 6,516,380 B2 | 2/2003 | Kenchammana-Hoskote et al. |
| 6,523,102 B1 | 2/2003 | Dye et al. |
| 6,564,285 B1 | 5/2003 | Mills et al. |
| 6,567,889 B1 | 5/2003 | DeKoning et al. |
| 6,587,915 B1 | 7/2003 | Kim |
| 6,587,937 B1 | 7/2003 | Jensen et al. |
| 6,601,211 B1 | 7/2003 | Norman |
| 6,625,685 B1 | 9/2003 | Cho et al. |
| 6,629,112 B1 | 9/2003 | Shank |
| 6,658,438 B1 | 12/2003 | Moore et al. |
| 6,671,757 B1 | 12/2003 | Multer et al. |
| 6,675,349 B1 | 1/2004 | Chen |
| 6,715,027 B2 | 3/2004 | Kim et al. |
| 6,715,046 B1 | 3/2004 | Shoham et al. |
| 6,728,851 B1 | 4/2004 | Estakhri et al. |
| 6,742,082 B1 | 5/2004 | Lango et al. |
| 6,751,155 B2 | 6/2004 | Gorobets |
| 6,754,774 B2 | 6/2004 | Gruner et al. |
| 6,757,800 B1 | 6/2004 | Estakhri et al. |
| 6,766,413 B2 | 7/2004 | Newman |
| 6,775,185 B2 | 8/2004 | Fujisawa et al. |
| 6,779,088 B1 | 8/2004 | Benveniste et al. |
| 6,779,094 B2 | 8/2004 | Selkirk et al. |
| 6,785,776 B2 | 8/2004 | Arimilli et al. |
| 6,785,785 B2 | 8/2004 | Piccirillo et al. |
| 6,801,979 B1 | 10/2004 | Estakhri |
| 6,804,755 B2 | 10/2004 | Selkirk et al. |
| 6,877,076 B1 | 4/2005 | Cho et al. |
| 6,880,049 B2 | 4/2005 | Gruner et al. |
| 6,883,069 B2 | 4/2005 | Yoshida |
| 6,883,079 B1 | 4/2005 | Priborsky |
| 6,910,170 B2 | 6/2005 | Choi et al. |
| 6,912,537 B2 | 6/2005 | Selkirk et al. |
| 6,912,618 B2 | 6/2005 | Estakhri et al. |
| 6,925,533 B2 | 8/2005 | Lewis |
| 6,938,133 B2 | 8/2005 | Johnson et al. |
| 6,957,158 B1 | 10/2005 | Hancock et al. |
| 6,959,369 B1 | 10/2005 | Ashton et al. |
| 6,977,599 B2 | 12/2005 | Widmer |
| 6,978,342 B1 | 12/2005 | Estakhri et al. |
| 6,981,070 B1 | 12/2005 | Luk et al. |
| 6,996,676 B2 | 2/2006 | Megiddo |
| 7,010,652 B2 | 3/2006 | Piccirillo et al. |
| 7,010,662 B2 | 3/2006 | Aasheim et al. |
| 7,013,376 B2 | 3/2006 | Hooper, III |
| 7,013,379 B1 | 3/2006 | Testardi |
| 7,035,974 B2 | 4/2006 | Shang |
| 7,036,040 B2 | 4/2006 | Nicholson et al. |
| 7,043,599 B1 | 5/2006 | Ware et al. |
| 7,047,366 B1 | 5/2006 | Ezra |
| 7,050,337 B2 | 5/2006 | Iwase et al. |
| 7,058,769 B1 | 6/2006 | Danilak |
| 7,069,393 B2 | 6/2006 | Miyata et al. |
| 7,073,028 B2 | 7/2006 | Lango et al. |
| 7,076,560 B1 | 7/2006 | Lango et al. |
| 7,076,599 B2 | 7/2006 | Aasheim et al. |
| 7,076,723 B2 | 7/2006 | Saliba |
| 7,082,495 B2 | 7/2006 | DeWhitt et al. |
| 7,082,512 B2 | 7/2006 | Aasheim et al. |
| 7,085,879 B2 | 8/2006 | Aasheim et al. |
| 7,089,391 B2 | 8/2006 | Geiger et al. |
| 7,093,101 B2 | 8/2006 | Aasheim et al. |
| 7,096,321 B2 | 8/2006 | Modha |
| 7,111,140 B2 | 9/2006 | Estakhri et al. |
| 7,130,956 B2 | 10/2006 | Rao |
| 7,130,957 B2 | 10/2006 | Rao |
| 7,143,228 B2 | 11/2006 | Lida et al. |
| 7,149,947 B1 | 12/2006 | MacLellan et al. |
| 7,155,531 B1 | 12/2006 | Lango et al. |
| 7,167,953 B2 | 1/2007 | Megiddo et al. |
| 7,171,536 B2 | 1/2007 | Chang et al. |
| 7,173,852 B2 | 2/2007 | Gorobets et al. |
| 7,178,081 B2 | 2/2007 | Lee et al. |
| 7,181,572 B2 | 2/2007 | Walmsley |
| 7,194,577 B2 | 3/2007 | Johnson et al. |
| 7,194,740 B1 | 3/2007 | Frank et al. |
| 7,197,657 B1 | 3/2007 | Tobias |
| 7,203,815 B2 | 4/2007 | Haswell |
| 7,215,580 B2 | 5/2007 | Gorobets |
| 7,219,238 B2 | 5/2007 | Saito et al. |
| 7,234,082 B2 | 6/2007 | Lai et al. |
| 7,243,203 B2 | 7/2007 | Scheuerlein |
| 7,246,179 B2 | 7/2007 | Camara et al. |
| 7,254,686 B2 | 8/2007 | Islam |
| 7,260,820 B1 | 8/2007 | Waldspurger et al. |
| 7,272,606 B2 | 9/2007 | Borthakur et al. |
| 7,275,135 B2 | 9/2007 | Coulson |
| 7,280,536 B2 | 10/2007 | Testardi |

(56) References Cited

U.S. PATENT DOCUMENTS

| | | | |
|---|---|---|---|
| 7,293,183 B2 | 11/2007 | Lee et al. |
| 7,305,520 B2 | 12/2007 | Voight et al. |
| 7,337,201 B1 | 2/2008 | Yellin et al. |
| 7,340,558 B2 | 3/2008 | Lee et al. |
| 7,340,566 B2 | 3/2008 | Voth et al. |
| 7,356,651 B2 | 4/2008 | Liu et al. |
| 7,360,015 B2 | 4/2008 | Matthews et al. |
| 7,360,037 B2 | 4/2008 | Higaki et al. |
| 7,366,808 B2 | 4/2008 | Kano et al. |
| 7,392,365 B2 | 6/2008 | Selkirk et al. |
| 7,395,384 B2 | 7/2008 | Sinclair et al. |
| 7,398,348 B2 | 7/2008 | Moore et al. |
| 7,424,593 B2 | 9/2008 | Estakhri et al. |
| 7,437,510 B2 | 10/2008 | Rosenbluth et al. |
| 7,441,090 B2 | 10/2008 | Estakhri et al. |
| 7,447,847 B2 | 11/2008 | Louie et al. |
| 7,450,420 B2 | 11/2008 | Sinclair et al. |
| 7,464,221 B2 | 12/2008 | Nakamura et al. |
| 7,487,235 B2 | 2/2009 | Andrews et al. |
| 7,487,320 B2 | 2/2009 | Bansai et al. |
| 7,500,000 B2 | 3/2009 | Groves et al. |
| 7,516,267 B2 | 4/2009 | Coulson et al. |
| 7,526,614 B2 | 4/2009 | van Riel |
| 7,529,905 B2 | 5/2009 | Sinclair |
| 7,536,491 B2 | 5/2009 | Kano et al. |
| 7,549,022 B2 | 6/2009 | Baker |
| 7,552,271 B2 | 6/2009 | Sinclair et al. |
| 7,580,287 B2 | 8/2009 | Aritome |
| 7,603,532 B2 | 10/2009 | Rajan et al. |
| 7,610,348 B2 | 10/2009 | Kisley et al. |
| 7,617,375 B2 | 11/2009 | Flemming et al. |
| 7,620,773 B2 | 11/2009 | Nicholson et al. |
| 7,640,390 B2 | 12/2009 | Iwamura et al. |
| 7,644,239 B2 | 1/2010 | Ergan et al. |
| 7,660,911 B2 | 2/2010 | McDaniel |
| 7,660,941 B2 | 2/2010 | Lee et al. |
| 7,664,239 B2 | 2/2010 | Groff et al. |
| 7,669,019 B2 | 2/2010 | Fujibayashi et al. |
| 7,673,108 B2 | 3/2010 | Iyengar et al. |
| 7,676,628 B1 | 3/2010 | Compton et al. |
| 7,685,367 B2 | 3/2010 | Ruia et al. |
| 7,694,065 B2 | 4/2010 | Petev et al. |
| 7,702,873 B2 | 4/2010 | Griess et al. |
| 7,721,047 B2 | 5/2010 | Dunshea et al. |
| 7,721,059 B2 | 5/2010 | Mylly et al. |
| 7,725,628 B1 | 5/2010 | Phan et al. |
| 7,801,894 B1 | 9/2010 | Bone et al. |
| 7,805,449 B1 | 9/2010 | Bone et al. |
| 7,831,773 B2 * | 11/2010 | Zedlewski et al. | 711/130 |
| 7,831,783 B2 | 11/2010 | Pandit et al. |
| 7,831,977 B2 | 11/2010 | Shultz et al. |
| 7,840,839 B2 | 11/2010 | Scales et al. |
| 7,853,772 B2 | 12/2010 | Chang et al. |
| 7,873,782 B2 | 1/2011 | Terry et al. |
| 7,873,803 B2 | 1/2011 | Cheng |
| 7,882,305 B2 | 2/2011 | Moritoki |
| 7,904,647 B2 | 3/2011 | El-Batal et al. |
| 7,913,051 B1 | 3/2011 | Todd et al. |
| 7,917,803 B2 | 3/2011 | Stefanus et al. |
| 7,941,591 B2 | 5/2011 | Aviles |
| 7,984,230 B2 | 7/2011 | Nasu et al. |
| 8,046,526 B2 | 10/2011 | Yeh |
| 8,055,820 B2 | 11/2011 | Sebire |
| 8,060,683 B2 | 11/2011 | Shultz et al. |
| 8,095,764 B1 | 1/2012 | Bauer et al. |
| 8,127,103 B2 | 2/2012 | Kano et al. |
| 8,135,900 B2 | 3/2012 | Kunimatsu et al. |
| 8,135,904 B2 | 3/2012 | Lasser et al. |
| 8,151,077 B1 | 4/2012 | Bauer et al. |
| 8,151,082 B2 | 4/2012 | Flynn et al. |
| 8,171,204 B2 | 5/2012 | Chow et al. |
| 8,195,929 B2 | 6/2012 | Banga et al. |
| 8,214,583 B2 | 7/2012 | Sinclair et al. |
| 2002/0069317 A1 | 6/2002 | Chow et al. |
| 2002/0069318 A1 | 6/2002 | Chow et al. |
| 2002/0103819 A1 | 8/2002 | Duvillier |
| 2002/0161855 A1 | 10/2002 | Manczak et al. |
| 2002/0181134 A1 | 12/2002 | Bunker et al. |
| 2002/0188711 A1 | 12/2002 | Meyer et al. |
| 2002/0194451 A1 | 12/2002 | Mukaida et al. |
| 2003/0061296 A1 | 3/2003 | Craddock et al. |
| 2003/0061550 A1 | 3/2003 | Ng et al. |
| 2003/0093741 A1 | 5/2003 | Argon et al. |
| 2003/0140051 A1 | 7/2003 | Fujiwara et al. |
| 2003/0145230 A1 | 7/2003 | Chiu et al. |
| 2003/0149753 A1 | 8/2003 | Lamb |
| 2003/0198084 A1 | 10/2003 | Fujisawa et al. |
| 2004/0002942 A1 | 1/2004 | Pudipeddi et al. |
| 2004/0003002 A1 | 1/2004 | Adelmann |
| 2004/0049564 A1 | 3/2004 | Ng et al. |
| 2004/0093463 A1 | 5/2004 | Shang |
| 2004/0117586 A1 | 6/2004 | Estakhri et al. |
| 2004/0148360 A1 | 7/2004 | Mehra et al. |
| 2004/0153694 A1 | 8/2004 | Nicholson et al. |
| 2004/0186946 A1 | 9/2004 | Lee |
| 2004/0205177 A1 | 10/2004 | Levy et al. |
| 2004/0225837 A1 | 11/2004 | Lewis |
| 2004/0268359 A1 | 12/2004 | Hanes |
| 2005/0002263 A1 | 1/2005 | Iwase et al. |
| 2005/0015539 A1 | 1/2005 | Horii et al. |
| 2005/0027951 A1 | 2/2005 | Piccirillo et al. |
| 2005/0055425 A1 | 3/2005 | Lango et al. |
| 2005/0055497 A1 | 3/2005 | Estakhri et al. |
| 2005/0076107 A1 | 4/2005 | Goud et al. |
| 2005/0120177 A1 | 6/2005 | Black |
| 2005/0132259 A1 | 6/2005 | Emmot et al. |
| 2005/0141313 A1 | 6/2005 | Gorobets et al. |
| 2005/0144361 A1 | 6/2005 | Gonzalez et al. |
| 2005/0144406 A1 | 6/2005 | Chong, Jr. |
| 2005/0149618 A1 | 7/2005 | Cheng |
| 2005/0149683 A1 | 7/2005 | Chong, Jr. et al. |
| 2005/0149819 A1 | 7/2005 | Hwang |
| 2005/0177672 A1 | 8/2005 | Rao |
| 2005/0177687 A1 | 8/2005 | Rao |
| 2005/0193166 A1 | 9/2005 | Johnson et al. |
| 2005/0216653 A1 | 9/2005 | Aasheim et al. |
| 2005/0229090 A1 | 10/2005 | Shen et al. |
| 2005/0240713 A1 | 10/2005 | Wu et al. |
| 2005/0246510 A1 | 11/2005 | Retnammana et al. |
| 2005/0257017 A1 | 11/2005 | Yagi |
| 2005/0257213 A1 | 11/2005 | Chu et al. |
| 2005/0273476 A1 | 12/2005 | Wertheimer et al. |
| 2005/0276092 A1 | 12/2005 | Hansen et al. |
| 2006/0004955 A1 | 1/2006 | Ware et al. |
| 2006/0020744 A1 | 1/2006 | Sinclair et al. |
| 2006/0026339 A1 | 2/2006 | Rostampour |
| 2006/0026385 A1 | 2/2006 | Dinechin et al. |
| 2006/0041731 A1 | 2/2006 | Jochemsen et al. |
| 2006/0053157 A1 | 3/2006 | Pitts |
| 2006/0059326 A1 | 3/2006 | Aasheim et al. |
| 2006/0075057 A1 | 4/2006 | Gildea et al. |
| 2006/0085626 A1 | 4/2006 | Roberson et al. |
| 2006/0090048 A1 | 4/2006 | Okumoto et al. |
| 2006/0106968 A1 | 5/2006 | Wooi Teoh |
| 2006/0117212 A1 | 6/2006 | Meyer et al. |
| 2006/0123197 A1 | 6/2006 | Dunshea et al. |
| 2006/0129778 A1 | 6/2006 | Clark et al. |
| 2006/0136657 A1 | 6/2006 | Rudelic et al. |
| 2006/0136685 A1 | 6/2006 | Griv et al. |
| 2006/0143389 A1 * | 6/2006 | Kilian et al. | 711/130 |
| 2006/0143396 A1 | 6/2006 | Cabot |
| 2006/0149893 A1 | 7/2006 | Barfuss et al. |
| 2006/0152981 A1 | 7/2006 | Ryu |
| 2006/0179263 A1 | 8/2006 | Song et al. |
| 2006/0184722 A1 | 8/2006 | Sinclair |
| 2006/0190552 A1 | 8/2006 | Henze et al. |
| 2006/0224849 A1 | 10/2006 | Islam et al. |
| 2006/0236061 A1 | 10/2006 | Koclanes |
| 2006/0248387 A1 | 11/2006 | Nicholson et al. |
| 2006/0265636 A1 | 11/2006 | Hummler |
| 2006/0271740 A1 | 11/2006 | Mark et al. |
| 2007/0006021 A1 | 1/2007 | Nicholson et al. |
| 2007/0016699 A1 | 1/2007 | Minami |
| 2007/0016754 A1 | 1/2007 | Testardi |

(56) References Cited

U.S. PATENT DOCUMENTS

| | | |
|---|---|---|
| 2007/0033325 A1 | 2/2007 | Sinclair |
| 2007/0033326 A1 | 2/2007 | Sinclair |
| 2007/0033327 A1 | 2/2007 | Sinclair |
| 2007/0033362 A1 | 2/2007 | Sinclair |
| 2007/0043900 A1 | 2/2007 | Yun |
| 2007/0050548 A1* | 3/2007 | Bali et al. ............... 711/118 |
| 2007/0050571 A1 | 3/2007 | Nakamura et al. |
| 2007/0061508 A1 | 3/2007 | Zweighaft |
| 2007/0086260 A1 | 4/2007 | Sinclair |
| 2007/0088666 A1 | 4/2007 | Saito |
| 2007/0118676 A1 | 5/2007 | Kano et al. |
| 2007/0118713 A1 | 5/2007 | Guterman et al. |
| 2007/0124474 A1 | 5/2007 | Margulis |
| 2007/0124540 A1 | 5/2007 | van Riel |
| 2007/0136555 A1 | 6/2007 | Sinclair |
| 2007/0143532 A1 | 6/2007 | Gorobets et al. |
| 2007/0143560 A1 | 6/2007 | Gorobets |
| 2007/0143566 A1 | 6/2007 | Gorobets |
| 2007/0147356 A1 | 6/2007 | Malas et al. |
| 2007/0150689 A1 | 6/2007 | Pandit et al. |
| 2007/0156998 A1 | 7/2007 | Gorobets |
| 2007/0168698 A1 | 7/2007 | Coulson et al. |
| 2007/0198770 A1 | 8/2007 | Horii et al. |
| 2007/0204128 A1 | 8/2007 | Lee et al. |
| 2007/0208790 A1 | 9/2007 | Reuter et al. |
| 2007/0214320 A1 | 9/2007 | Ruia et al. |
| 2007/0233455 A1 | 10/2007 | Zimmer et al. |
| 2007/0233937 A1 | 10/2007 | Coulson et al. |
| 2007/0250660 A1 | 10/2007 | Gill et al. |
| 2007/0260608 A1 | 11/2007 | Hertzberg et al. |
| 2007/0261030 A1 | 11/2007 | Wadhwa |
| 2007/0263514 A1 | 11/2007 | Iwata et al. |
| 2007/0266037 A1 | 11/2007 | Terry et al. |
| 2007/0271468 A1 | 11/2007 | McKenney et al. |
| 2007/0274150 A1 | 11/2007 | Gorobets |
| 2007/0276897 A1 | 11/2007 | Tameshige et al. |
| 2007/0300008 A1 | 12/2007 | Rogers et al. |
| 2008/0005748 A1 | 1/2008 | Matthew et al. |
| 2008/0010395 A1 | 1/2008 | Mylly et al. |
| 2008/0043769 A1 | 2/2008 | Hirai |
| 2008/0052377 A1 | 2/2008 | Light |
| 2008/0052477 A1 | 2/2008 | Lee et al. |
| 2008/0059752 A1 | 3/2008 | Serizawa |
| 2008/0071977 A1 | 3/2008 | Chow et al. |
| 2008/0091876 A1 | 4/2008 | Fujibayashi et al. |
| 2008/0098159 A1 | 4/2008 | Song |
| 2008/0104321 A1 | 5/2008 | Kamisetty et al. |
| 2008/0109090 A1 | 5/2008 | Esmaili et al. |
| 2008/0120469 A1 | 5/2008 | Kornegay |
| 2008/0126507 A1 | 5/2008 | Wilkinson |
| 2008/0126700 A1 | 5/2008 | El-Batal et al. |
| 2008/0126852 A1 | 5/2008 | Brandyberry et al. |
| 2008/0133963 A1 | 6/2008 | Katano et al. |
| 2008/0137658 A1 | 6/2008 | Wang |
| 2008/0140737 A1 | 6/2008 | Garst et al. |
| 2008/0140819 A1 | 6/2008 | Bailey et al. |
| 2008/0205286 A1 | 8/2008 | Li et al. |
| 2008/0229045 A1 | 9/2008 | Qi |
| 2008/0235443 A1 | 9/2008 | Chow et al. |
| 2008/0243966 A1 | 10/2008 | Croisettier et al. |
| 2008/0263259 A1 | 10/2008 | Sadovsky et al. |
| 2008/0263305 A1 | 10/2008 | Shu et al. |
| 2008/0263569 A1 | 10/2008 | Shu et al. |
| 2008/0276040 A1 | 11/2008 | Moritoki |
| 2008/0294847 A1 | 11/2008 | Maruyama et al. |
| 2009/0070526 A1 | 3/2009 | Tetrick |
| 2009/0083478 A1 | 3/2009 | Kunimatsu et al. |
| 2009/0083485 A1 | 3/2009 | Cheng |
| 2009/0089485 A1 | 4/2009 | Yeh |
| 2009/0125650 A1 | 5/2009 | Sebire |
| 2009/0125700 A1 | 5/2009 | Kisel |
| 2009/0150599 A1 | 6/2009 | Bennett |
| 2009/0150605 A1 | 6/2009 | Flynn et al. |
| 2009/0150641 A1 | 6/2009 | Flynn et al. |
| 2009/0228637 A1 | 9/2009 | Moon |
| 2009/0248763 A1 | 10/2009 | Rajan et al. |
| 2009/0248922 A1 | 10/2009 | Hinohara et al. |
| 2009/0276588 A1 | 11/2009 | Murase |
| 2009/0276654 A1 | 11/2009 | Butterworth |
| 2009/0287887 A1 | 11/2009 | Matsuki et al. |
| 2009/0292861 A1 | 11/2009 | Kanevsky et al. |
| 2009/0300277 A1 | 12/2009 | Jeddoloh |
| 2009/0307424 A1 | 12/2009 | Galloway et al. |
| 2009/0313453 A1 | 12/2009 | Stefanus et al. |
| 2009/0327602 A1 | 12/2009 | Moore et al. |
| 2009/0327804 A1 | 12/2009 | Moshayedi |
| 2010/0005072 A1 | 1/2010 | Pitts |
| 2010/0005228 A1 | 1/2010 | Fukutomi et al. |
| 2010/0011147 A1 | 1/2010 | Hummel |
| 2010/0017556 A1 | 1/2010 | Chin |
| 2010/0017568 A1 | 1/2010 | Wadhawan et al. |
| 2010/0023674 A1 | 1/2010 | Aviles |
| 2010/0023676 A1 | 1/2010 | Moon |
| 2010/0023682 A1 | 1/2010 | Lee et al. |
| 2010/0030946 A1 | 2/2010 | Kano et al. |
| 2010/0036840 A1 | 2/2010 | Pitts |
| 2010/0042805 A1 | 2/2010 | Recio et al. |
| 2010/0070701 A1 | 3/2010 | Iyigun et al. |
| 2010/0070725 A1 | 3/2010 | Prahlad et al. |
| 2010/0070747 A1 | 3/2010 | Iyigun et al. |
| 2010/0070982 A1 | 3/2010 | Pitts |
| 2010/0076936 A1 | 3/2010 | Rajan |
| 2010/0077194 A1 | 3/2010 | Zhao et al. |
| 2010/0082774 A1 | 4/2010 | Pitts |
| 2010/0082922 A1 | 4/2010 | George |
| 2010/0095059 A1 | 4/2010 | Kisley et al. |
| 2010/0169542 A1 | 7/2010 | Sinclair |
| 2010/0199036 A1 | 8/2010 | Siewert et al. |
| 2010/0205231 A1 | 8/2010 | Cousins |
| 2010/0205335 A1 | 8/2010 | Phan et al. |
| 2010/0211737 A1 | 8/2010 | Flynn et al. |
| 2010/0217916 A1* | 8/2010 | Gao et al. .................. 711/6 |
| 2010/0228903 A1 | 9/2010 | Chandrasekaran et al. |
| 2010/0235597 A1 | 9/2010 | Arakawa |
| 2010/0262738 A1 | 10/2010 | Swing et al. |
| 2010/0262740 A1 | 10/2010 | Borchers et al. |
| 2010/0262757 A1 | 10/2010 | Sprinkle et al. |
| 2010/0262758 A1 | 10/2010 | Swing et al. |
| 2010/0262759 A1 | 10/2010 | Borchers et al. |
| 2010/0262760 A1 | 10/2010 | Swing et al. |
| 2010/0262761 A1 | 10/2010 | Borchers et al. |
| 2010/0262762 A1 | 10/2010 | Borchers et al. |
| 2010/0262766 A1 | 10/2010 | Sprinkle et al. |
| 2010/0262767 A1 | 10/2010 | Borchers et al. |
| 2010/0262773 A1 | 10/2010 | Borchers et al. |
| 2010/0262894 A1 | 10/2010 | Swing et al. |
| 2010/0262979 A1 | 10/2010 | Borchers et al. |
| 2011/0022819 A1 | 1/2011 | Post et al. |
| 2011/0107033 A1 | 5/2011 | Grigoriev et al. |
| 2011/0231857 A1 | 9/2011 | Zaroo et al. |
| 2011/0265083 A1* | 10/2011 | Davis .......................... 718/1 |
| 2011/0314202 A1 | 12/2011 | Iyigun et al. |
| 2011/0320733 A1 | 12/2011 | Sanford et al. |
| 2012/0159081 A1 | 6/2012 | Agrawal et al. |
| 2012/0173824 A1 | 7/2012 | Iyigun et al. |

FOREIGN PATENT DOCUMENTS

| | | |
|---|---|---|
| EP | 1418502 | 5/2004 |
| EP | 1814039 | 3/2009 |
| GB | 123416 | 9/2001 |
| JP | 4242848 | 8/1992 |
| JP | 8153014 | 6/1996 |
| JP | 200259525 | 9/2000 |
| JP | 2009122850 | 6/2009 |
| WO | WO94/19746 | 9/1994 |
| WO | WO95/18407 | 7/1995 |
| WO | WO96/12225 | 4/1996 |
| WO | WO01/31512 | 5/2001 |
| WO | WO02/01365 | 1/2002 |
| WO | 2004061645 A2 | 7/2004 |
| WO | WO2004/061645 | 7/2004 |
| WO | WO2004/099989 | 11/2004 |
| WO | WO2005/103878 | 11/2005 |

(56) References Cited

FOREIGN PATENT DOCUMENTS

| WO | WO2006/062511 | 6/2006 |
|---|---|---|
| WO | WO2006/065626 | 6/2006 |
| WO | WO2008/130799 | 3/2008 |
| WO | WO2008/073421 | 6/2008 |
| WO | WO2011/106394 | 9/2011 |

OTHER PUBLICATIONS

NEVEX Virtual Technologies, CacheWorks Data Sheet, http://www.nevex.com/wp-content/uploads/2010/12/Data-Sheet3.pdf, Published Dec. 1, 2010, Visited Aug. 1, 2012.
David C. Steere et al., "Efficient User-Level File Cache Management on the Sun Vnode Interface," School of Computer Science, Carnegie Mellon University, CMU-CS-90-126, Usenix Conference Proceedings, Jun. 1990.
Pin Lu et al., Virtual machine memory access tracing with hypervisor exclusive cache, Proceedings of the USENIX Annual Technical Conference 2007 (ATC'07), Article No. 3, 15 pages.
Mark Friedman et al., File Cache Performance and Tuning, Windows 2000 Performance Guide, O'Reilly & Associates, Inc., http://msdn.microsoft.com/en-us/library/ms369863.aspx, Published Jan. 2002, Visited Aug. 3, 2012.
Microsoft, Filter Driver Development Guide, http://download.microsoft.com/download/e/b/a/eba1050f-a31d-436b-9281-92cdfeae4b45/FilterDriverDeveloperGuide.doc, 2004, Published 2004, Visited Aug. 3, 2012.
Microsoft, File Cache Management, Windows Embedded CE 6.0 R3, msdn.microsoft.com/en-us/subscriptions/aa911545.aspx, Published Aug. 28, 2008, Visited Aug. 3, 2012.
D. Muntz et al., Multi-level Caching in Distributed File Systems, CITI Technical Report 91-3, Aug. 16, 1991.
Omesh Tickoo et al, Modeling Virtual Machine Performance: Challenges and Approaches, *SIGMETRICS Perform. Eval. Rev.* 37, 3 (Jan. 2010), 55-60. DOI=10.1145/1710115.1710126 http://doi.acm.org/10.1145/1710115.1710126.
Craig Linn, Windows I/O Performance: Cache Manager and File System Considerations, CMGA Proceedings, Sep. 6, 2006.
Adabas, Adabas Caching Configuration and Tuning, http://documentation.softwareag.com/adabas/ada821mfr/addons/acf/config/cfgover.htm, Published Sep. 2009, Visited Aug. 3, 2012.
Adabas, Adabas Caching Facility, http://www.softwareag.com/es/Images/Adabas_Caching_Facility_tcm24-71167.pdf, Published 2008, Visited Aug. 3, 2012.
VMware, Introduction to VMware vSphere, http://www.vmware.com/pdf/vsphere4/r40/vsp_40_intro_vs.pdf, Published 2009, Visited Aug. 1, 2012.
VMware, Virtual Disk API Programming Guide, Virtual Disk Development Kit 1.2, Published Nov. 2010, Visited Aug. 3, 2012.
Atlantis Computing Technology, Caching, http://atlantiscomputing.com/technology/caching, published 2012, accessed Aug. 1, 2012.
Richard Rosen, IntelliCache, Scalability and consumer SSDs, blogs.citrix.com/2012/01/03/intellicache-scalability-and-consumer-ssds, Jan. 3, 2012, accessed Aug. 3, 2012.
Christian Ferber, XenDesktop and local storage + IntelliCache, Jun. 22, 2011, blogs.citrix.com/2011/06/22/xendesktop-and-local-storage-intellicache/, accessed Aug. 3, 2012.
Citrix, XenServer-6.0.0 Installation Guide, Mar. 2, 2012, http://support.citrix.com/servlet/KbServlet/download/28750-102-673824/XenServer-6.0.0-installation.pdf. accessed Aug. 3, 2012.
Adabas, Adabas Caching ASSO, DATA, WORK, Aug. 26, 2011, http://communities.softwareag.com/web/guest/pwiki/-/wiki/Main/.../pop_up?_36_viewMode=print, Oct. 2008, accessed Aug. 3, 2012.
Adabas, File Level Caching, http://documentation.softwareag.com/adabas/ada824mfr/addons/acf/services/file-level-caching.htm, accessed Aug. 3, 2012.
Micron, "TN-29-08: Technical Note, Hamming Codes for NAND Flash Memory Devices," Mar. 10, 2010.
Micron, "TN-29-17: NAND Flash Design and Use Considerations," Mar. 10, 2010.
Micron, "TN-29-42: Wear-Leveling Techniques in NAND Flash Devices," Mar. 10, 2010.
Microsoft, Data Set Management Commands Proposal for ATA8-ACS2, published Oct. 5, 2007, Rev. 3.
Microsoft, "How NTFS Works," Apr. 9, 2010.
Morgenstern, David, "Is There a Flash Memory RAID in your Future?", http://www.eweek.com—eWeek, Ziff Davis Enterprise Holdings Inc., Nov. 8, 2006, visited Mar. 18, 2010.
Novell, "File System Primer", http://wiki.novell.com/index.php/File_System_Primer, 2006, visited Oct. 18, 2006.
Perfectcacheserver, "Automatic Disk Caching," http://www.Raxco.Com/business/perfectcache_server.aspx, last visited Oct. 31, 2012.
PIVOT3, "RAIGE Cluster: Technology Overview," White Paper, www.pivot3.com, Jun. 2007.
Plank, "A Tutorial on Reed-Solomon Coding for Fault Tolerance in RAID-like System," Department of Computer Science, University of Tennessee, pp. 995-1012, Sep. 1997.
Porter, "Operating System Transactions," ACM 978-1-60558-752-03/09/10, published Oct. 1, 2009.
Probert, "Windows Kernel Internals Cache Manager," Microsoft Corporation, http://www.i.u.tokyo.ac.jp/edu/training/ss/lecture/new-documents/Lectures/15-CacheManager/CacheManager.pdf, printed May 15, 2010.
Ranaweera, 05-270RO, SAT: Write Same (10) command (41h), T10/05, Jul. 7, 2005, www.t10.org/ftp/t10/document.05/05-270r0.pdf, last visited Apr. 11, 2013.
Rosen, Richard, "IntelliCache, Scalability and consumer SSDs," blogs.citrix.com/2012/01/03/intellicache-scalability-and-consumer-ssds, Jan. 3, 2012, accessed Aug. 3, 2012.
Rosenblum, "The Design and Implementation of a Log-Structured File System," ACM Transactions on Computer Systems, vol. 10 Issue 1, Feb. 1992.
Samsung Electronics, "Introduction to Samsung's Linux Flash File System—RFS Application Note", Version 1.0, Nov. 2006.
Seagate Technology LLC, "The Advantages of Object-Based Storage-Secure, Scalable, Dynamic Storage Devices, Seagate Research Technology Paper, TP-536" Apr. 2005.
Sears, "Stasis: Flexible Transactional Storage," OSDI '06: 7th USENIX Symposium on Operating Systems Design and Implementation, published Nov. 6, 2006.
Seltzer, "File System Performance and Transaction Support", University of California at Berkeley, published Jan. 1, 1992.
Seltzer, "Transaction Support in a Log-Structured File System", Harvard University Division of Applied Sciences, published Jan. 1, 1993 (Chapter 5, pp. 52-69).
Seltzer, "Transaction Support in Read Optimized and Write Optimized File Systems," Proceedings of the 16th VLDB Conference, Brisbane, Australia, published Jan. 1, 1990.
Shimpi, Anand, The SSD Anthology: Understanding SSDs and New Drives from OCZ, Mar. 18, 2009, 69 pgs.
Shu, "Data Set Management Commands Proposals for ATA8-ACS2," Dec. 12, 2007, http://www.t13.org.Documents/Uploaded Documents/docs2008/e07154r6-Data_Set_Management_Proposal_for_ATA-ACS2.pdf, printed Apr. 5, 2010.
Singer, Dan, "Implementing MLC ND Flash for Cost-Effective, High Capacity Memory," M-Systems, White Paper, 91-SR014-02-8L, Rev. 1.1, Sep. 2003.
Solidata, "Best Practices Guide, Sybase: Maximizing Performance through Solid State File-Caching," http://solidata.com/resources/pdf/bp-sybase.pdf. May 2000, cited May 18, 2011.
Spansion, "Data Management Software (DMS) for AMD Simultaneous Read/Write Flash Memory Devices", published Jul. 7, 2003.
Spillane, "Enabling Transactional File Access via Lightweight Kernel Extensions", Stony Brook University, IBM T. J. Watson Research Center, published Feb. 25, 2009.
State Intellectual Property Office, Office Action, CN Application No. 200780050970.0, issued Jun. 29, 2011.
State Intellectual Property Office, Office Action, CN Application No. 200780050973.4, issued Jan. 26, 2011.
State Intellectual Property Office, Office Action, CN Application No. 200780050970.0, issued Oct. 28, 2010.

(56) References Cited

OTHER PUBLICATIONS

State Intellectual Property Office, Office Action, CN Application No. 200780051020.X, issued Nov. 11, 2010.
State Intellectual Property Office, Office Action, CN Application No. 200780050983.8, issued May 18, 2011.
State Intellectual Property Office, Office Action, CN Application No. 200780051020.X, issued Jul. 6, 2011.
State Intellectual Property Office, Office Action, CN Application No. 200780051020.X, issued Nov. 7, 2011.
State Intellectual Property Office, Office Action, CN Application No. 200780050970.0, issued Jan. 5, 2012.
Steere, David et al., Efficient User-Level File Cache Management on the Sun Vnode Interface, School of Computer Science, Carnegie Mellon University, Apr. 18, 1990.
Superspeed, "New Super Cache 5 on Servers," http://www.superspeed.com/servers/supercache.php, last visited Oct. 31, 2013.
Actel, "Actel Fusion FPGAs Supporting Intelligent Peripheral Management Interface (IPMI) Applications," http://www.actel.com/documents/Fusion_IPMI_AN.pdf, Oct. 1, 2006, visited Mar. 11, 2010.
Agigatech Bulletproof Memory for RAID Servers, Part 1, http://agigatech.com/blog/bulletproof-memory-for-raid-servers-part-1/, last visited Feb. 16, 2010.
Anonymous, "Method for Fault Tolerance in Nonvolatile Storage", http://ip.com, IP.com No. IPCOM000042269D, 2005.
Ari, "Performance Boosting and Workload Isolation in Storage Area Networks with SanCache," Hewlett Packard Laboratories, Proceedings of the 23rd IEEE / 14th SA Goddard Conference on Mass Storage Systems and Technologies (MSST 2006), May 2006, pp. 263-327.
Arpaci-Dusseau, "Removing the Costs of Indirection in Flash-based SSDs with Nameless Writes," Jun. 2010, HotStorage'10, Boston, MA.
Asine, "ASPMC-660 Rugged IDE Flash Drive PMC Module," http://www.asinegroup.com/products/aspmc660.html, copyright 2002, visited Nov. 8, 2009.
Bandulet "Object-Based Storage Devices," Jul. 2007 http://developers.sun.com/solaris/articles/osd.htme, visited Dec. 1, 2011.
Barrall et al., U.S. Appl. No. 60/625,495, "Dynamically Expandable and Contractible Fault-Tolerant Storage System Permitting Variously Sized Storage Devices and Method," filed Nov. 5, 2004.
Barrall et al., U.S. Appl. No. 60/718,768, "Dynamically Adaptable Fault-Tolerant Storage System," filed Sep. 20, 2005.
BiTMICRO, "BiTMICRO Introduces E-Disk PMC Flash Disk Module at Military & aerospace Electronics East 2004," http://www.bitmicro.com/press.sub, published May 18, 2004, visited Mar. 8, 2011.
Bonnet, "Flash Device Support for Database Management," published Jan. 9, 2011.
Brandon, Jr., "Sparse Matrices in CS Education," Journal of Computing Sciences in Colleges, vol. 24 Issue 5, May 2009, pp. 93-98.
Casey, "San Cache: SSD in the San," Storage Inc., http://www.solidata.com/resourses/pdf/storageing.pdf, 2000, visited May 20, 2011.
Casey, "Solid State File-Caching for Performance and Scalability," SolidData Quarter Jan. 2000, http://www/storagesearch._com/3dram.html, visited May 20, 2011.
Clustered Storage Solutions: "Products," http://www.clusteredstorage.com/clustered_storage_solutions.HTML, last visited Feb. 16, 2010.
Coburn, "NV-Heaps: Making Persistent Objects Fast and Safe with Next-Generation, Non-Volatile Memories", ACM 978-1-4503-0266-1/11/0, published Mar. 5, 2011.
Data Direct Networks, "White Paper: S2A9550 Overview," www.//datadirectnet. com, 2007.
EEEL-6892, Lecture 18, "Virtual Computers," Mar. 2010.
ELNEC, "NAND Flash Memories and Programming NAND Flash Memories Using ELNEC Device Programmers, Application Note," published Mar. 1, 2007.
Friedman, Mark, et al., "File Cache Performance and Tuning, Windows 2000 Performance Guide, O'Reilly & Associates, Inc., http://msdn.microsoft.com/en-us/library/ms369863.aspx," published Jan. 2002, visited Aug. 3, 2012.
Gal, "A Transactional Flash File System for Microcontrollers," 2005 USENIX Annual Technical Conference, published Apr. 10, 2009.
Garfinkel, "One Big File is Not Enough: A Critical Evaluation of the Dominant Free-Space Sanitization Technique," 6th Workshop on Privacy Enhancing Technologies. Cambridge, United Kingdom, published Jun. 1, 2006.
Gill, "WOW: Wise Ordering for Writes—Combining Spatial and Temporal Locality in Non-Volatile Caches," IBM, Fast 05: 4th Usenix Conference on File and Storage Technologies, 2005.
Gutmann, "Secure Deletion of Data from Magnetic and Solid-State Memory", Usenix, 14 pages, San Jose, CA, published Jul. 1, 1996.
Huffman, "Non-Volatile Memory Host Controller Interface," Apr. 14, 2008, 65 pgs.
Hynix Semiconductor, Intel Corporation, Micron Technology, Inc. Phison Electronics Corp., Sony Corporation, Spansion, STMicroelectronics, "Open NAND Flash Interface Specification," Revision 2.0, Feb. 27, 2008.
Hystor: "Making SSDs the Survival of the Fittest in High-Performance Storage Systems," ics10-Paper 102, Feb. 2010.
IBM, "Method to Improve Reliability of SSD Arrays," Nov. 2009.
Information Technology, "SCSI Object-Based Storage Device Commands," 2 (OSD-2), Project T10/1729-D, Revision 4, published Jul. 30, 2004, printed Jul. 24, 2008.
Intel, "Non-Volatile Memory Host Controller Interface (NVMHCI) 1.0," Apr. 14, 2008.
Johnson, "An Introduction to Block Device Drivers," Jan. 1, 1995.
Kawaguchi, "A Flash-Memory Based File System," TCON'95 Proceedings of the USENIX 1995 Technical Conference Proceedings, p. 13.
Linn, Craig, "Windows I/O Performance: Cache Manager and File System Considerations," CMGA Proceedings, Sep. 6, 2006.
Lu, Pin, "Virtual Machine Memory Access Tracing with Hypervisor Exclusive Cache," Departmentn of Computer Science, University of Rochester, 2007.
Mesnier, "Object-Based Storage," IEEE Communications Magazine, Aug. 2003, pp. 84-90.
Micron Technology, Inc., "NAND Flash 101: An Introduction to ND Flash and How to Design It in to Your Next Product (TN-29-19)," http://www.micron.com/~/media/Documents/Products/Technical%20Note/ND%20Flash/145tn2919_nd_101.pdf, 2006, visited May 10, 2010.
Tal, "NAND vs. NOR Flash Technology," M-Systems, www2.electronicproducts.com/PrintArticle.aspx?ArticleURL=FEBMSY1.feb2002.html, visited Nov. 22, 2010.
Terry et al., U.S. Appl. No. 60/797,127, "Filesystem-aware Block Storage System, Apparatus, and Method," filed May 3, 2006.
USPTO, Interview Summary for U.S. Appl. No. 10/372,734, mailed Feb. 28, 2006.
USPTO, Notice of Allowance for U.S. Appl. No. 12/986,117, Mailed Apr. 4, 2013.
USPTO, Notice of Allowance for U.S. Appl. No. 12/986,117 Mailed Jun. 5, 2013.
USPTO, Office Action for U.S. Appl. No. 12/879,004 mailed Feb. 25, 2013.
USPTO, Office Action for U.S. Appl. No. 13/607,486 mailed Jan. 10, 2013.
USPTO, Office Action for U.S. Appl. No. 10/372,734, mailed Sep. 1, 2005.
USPTO, Office Action for U.S. Appl. No. 11/952,113, mailed Dec. 15, 2010.
USPTO, Office Action for U.S. Appl. No. 12/711,113, mailed Jun. 6, 2012.
USPTO, Office Action for U.S. Appl. No. 12/711,113, mailed Nov. 23, 2012.
USPTO, Office Action for U.S. Appl. No. 13/607,486 mailed May 2, 2013.
USPTO, Office Action for U.S. Appl. No. 13/118,237 mailed Apr. 22, 2013.

(56) References Cited

OTHER PUBLICATIONS

USPTO, Notice of Allowance, U.S. Appl. No. 11/952,109, issued May 1, 2013.
USPTO, Office Action, U.S. Appl. No. 11/952,109, mailed Nov. 29, 2011.
Van Hensbergen, IBM Research Report, "Dynamic Policy Disk Caching for Storage Networking," IBM Research Division, Computer Science, RC24123 (W0611-189), Nov. 28, 2006.
Volos, "Mnemosyne: Lightweight Persistent Memory", ACM 978-1-4503-0266-1/11/03, published Mar. 5, 2011.
Wacha, "Improving RAID-Based Storage Systems with Flash Memory," First Annual ISSDM/SRL Research Symposium, Oct. 20-21, 2009.
Walp, "System Integrated Flash Storage," Microsoft Corporation, 2008, http://download.microsoft.com/download/5/E/6/5E66B27B-988B-4F50-AF3A-C2FF1E62180F/COR-T559_WHO8.pptx, Printed Apr. 6, 2010, 8 pgs.
Wang, "OBFS: A File System for Object-based Storage Devices", 21st IEE/12th SA Goddard Conference on Mass Storage Systems and Technologies, Apr. 2004.
Wikipedia, "Object Storage Device," http://en.wikipedia.org/wiki/Object-storage-device, last visited Apr. 29, 2010.
Winnett, Brad, "S2A9550 Overview," White Paper, http://www.ddn.com/pdfs/ddn_s2a_9550_white_paper.pdf, Jul. 2006, 27 pgs.
WIPO, International Preliminary Report of Patentability for PCT/US2007/086691, mailed Feb. 16, 2009.
WIPO, International Preliminary Report on Patentability for PCT/US2007/086688, mailed Mar. 16, 2009.
WIPO, International Preliminary Report on Patentability for PCT/US2007/086701, mailed Mar. 16, 2009.
WIPO, International Preliminary Report on Patentability for PCT/US2007/086687, mailed Mar. 18, 2009.
WIPO, International Preliminary Report on Patentability for PCT/US2007/025048, mailed Jun. 10, 2009.
WIPO, International Preliminary Report on Patentability for PCT/US2010/048325, mailed Mar. 13, 2012.
WIPO, International Search Report and Written Opinion for PCT/US2007/086691, mailed May 8, 2008.
WIPO, International Search Report and Written Opinion for PCT/US2007/025049, mailed May 14, 2008.
WIPO, International Search Report and Written Opinion for PCT/US2007/025048, mailed May 27, 2008.
WIPO, International Search Report and Written Opinion for PCT/US2007/086701, mailed Jun. 5, 2008.
WIPO, International Search Report and Written Opinion for PCT/US2007/086687, mailed Sep. 5, 2008.
WIPO, International Search Report and Written Opinion for PCT/US2011/65927, mailed Aug. 28, 2012.
WIPO, International Search Report and Written Opinion for PCT/US2012/029722, mailed Oct. 30, 2012.
WIPO, International Search Report and Written Opinion PCT/US2010/025885, mailed Sep. 28, 2011.
WIPO, International Search Report PCT/US2012/050194, mailed Feb. 26, 2013.
Woodhouse, "JFFS: The Journaling Flash File System," Ottawa Linux Symposium, http://sources.redhat.com/jffs2/jffs2.pdf, Jul. 2001.
Wright, "Extending ACID Semantics to the File System", ACM Transactions on Storage, vol. 3, No. 2, published May 1, 2011, pp. 1-40.
Wu, "eNVy: A Non-Volatile, Main Memory Storage System," ACM 0-89791-660-3/94/0010, ASPLOS-VI Proceedings of the sixth international conference on Architectural support for programming languages and operating systems, pp. 86-97, 1994.
Yerrick, "Block Device," http://www.pineight.com/ds/block, last visited Mar. 1, 2010.
WIPO, International Search Report and Written Opinion for PCT/US2012/039189, Dec. 27, 2012.

\* cited by examiner

| TIME (HH:MM) | CLOCK HAND 1 (10 MINUTES) | | CLOCK HAND 2 (1 HOUR) | |
|---|---|---|---|---|
| | BIT 1 | BIT 2 | BIT 1 | BIT 2 |
| 00:00 | 1 | 1 | 1 | 1 |
| 00:05 | 1 | 1 | 1 | 1 |
| 10 MINUTE CLOCK SWEEP | | | | |
| 00:08 | 1 | 0 | 1 | 1 |
| 10 MINUTE CLOCK SWEEP | | | | |
| 00:18 | 0 | 0 | 1 | 1 |
| DATA ACCESS | | | | |
| 00:22 | 1 | 1 | 1 | 1 |
| 10 MINUTE CLOCK SWEEP | | | | |
| 00:28 | 1 | 0 | 1 | 1 |
| 1 HOUR CLOCK SWEEP | | | | |
| 00:31 | 1 | 0 | 1 | 0 |
| 10 MINUTE CLOCK SWEEP | | | | |
| 00:38 | 0 | 0 | 1 | 0 |
| 10 MINUTE CLOCK SWEEP | | | | |
| 00:48 | 0 | 0 | 1 | 0 |
| 10 MINUTE CLOCK SWEEP | | | | |
| 00:58 | 0 | 0 | 1 | 0 |
| DATA ACCESS | | | | |
| 01:04 | 1 | 1 | 1 | 1 |
| DATA ACCESS | | | | |
| 01:07 | 1 | 1 | 1 | 1 |
| 10 MINUTE CLOCK SWEEP | | | | |
| 01:08 | 1 | 0 | 1 | 1 |

| Next Cache Tag Index | State | Clock Hands | Checksum | Valid Unit Map |
|---|---|---|---|---|
|  |  |  |  |  |
|  |  |  |  |  |

SYSTEMS AND METHODS FOR MANAGING DATA INPUT/OUTPUT OPERATIONS

BACKGROUND

Various types of computing environments share resources across multiple hosts or other systems. For example, virtualized systems and virtualized environments often support the sharing and load balancing of resources across multiple hosts or other systems. In this example, a single host device can support multiple virtual machines that share common hardware components, storage systems, and the like. These virtual machines may also be referred to as "guest operating systems" as each host device is capable of supporting multiple instances of one or more operating systems.

When sharing a data storage system across multiple hosts or multiple virtual machines, the computing environment must properly manage a high volume of data input/output (I/O) operations. The volume of I/O operations is commonly measured in IOPS (I/O Operations Per Second). FIG. 1 illustrates an example of an existing virtualized environment 100 including multiple hosts 102, 104, and 106, and a data storage system 108. In a particular implementation, hosts 102-106 are servers or other computing devices capable of performing a variety of processing and computing functions. Each host 102-106 includes multiple virtual machines 110 operating simultaneously.

During their normal operation, virtual machines 110 initiate data I/O requests, such as data read requests and data write requests, associated with data storage system 108. Data storage system 108 includes multiple data storage drives 112 and/or other data storage mechanisms. The storage resources associated with data storage system 108 are shared among the multiple hosts 102-106 and the virtual machines 110 included in those hosts. Each host 102-106 includes a virtualization kernel 114 (also referred to as a "hypervisor") that manages the virtual machines 110 as well as shared resources, such as data storage system 108.

As the number of virtual machines associated with a particular host increases, there is a corresponding increase in demand for shared resources, such as memory and I/O resources. An increase in I/O resource utilization includes an increased number of data I/O operations that cause a corresponding increase in data communicated between a host and a data storage system. In existing virtualized systems, the increased demand for shared resources such as I/O bandwidth often degrades the performance of the virtualized system. In these situations, one or more of the virtual machines experiences increased latency associated with the data I/O operations, which decreases the performance of the virtual machines. Thus, it is desirable to provide a computing environment that improves the handling of data I/O operations associated with multiple hosts or other systems.

BRIEF DESCRIPTION OF THE DRAWINGS

FIG. 10 illustrates example clock hand data values associated with a cache tag over time.

Throughout the description, similar reference numbers may be used to identify similar elements.

DETAILED DESCRIPTION

The systems and methods described herein relate to the management of data input/output (I/O) operations in a computing environment. Although particular examples discussed herein relate to virtualized environments, the same systems and methods are applicable to any type of computing environment. In particular implementations, the described systems and methods intercept I/O operations in the virtualized environment to dynamically allocate resources, such as cache resources, across multiple virtual machines in the virtualized environment. This management of data I/O operations improves the performance of the virtual machines and reduces the number of I/O operations handled by the primary storage system. Additionally, the management of I/O operations is transparent to other components in the virtualized environment and can be implemented without modification to existing application software or existing data storage systems.

Specific systems and methods described herein utilize a cache memory constructed with various memory devices, such as flash memory devices or RAM (random access memory) that may or may not be block oriented. The systems and methods described herein do not differentiate between Flash memory, RAM or other types of memory. The described systems and methods may utilize any type of memory device, regardless of the specific type of memory device shown in any figures or described herein. Particular systems and methods described herein may generally be referred to as an "I/O hypervisor" due to its management of I/O operations in a virtualized environment.

Figure 1:
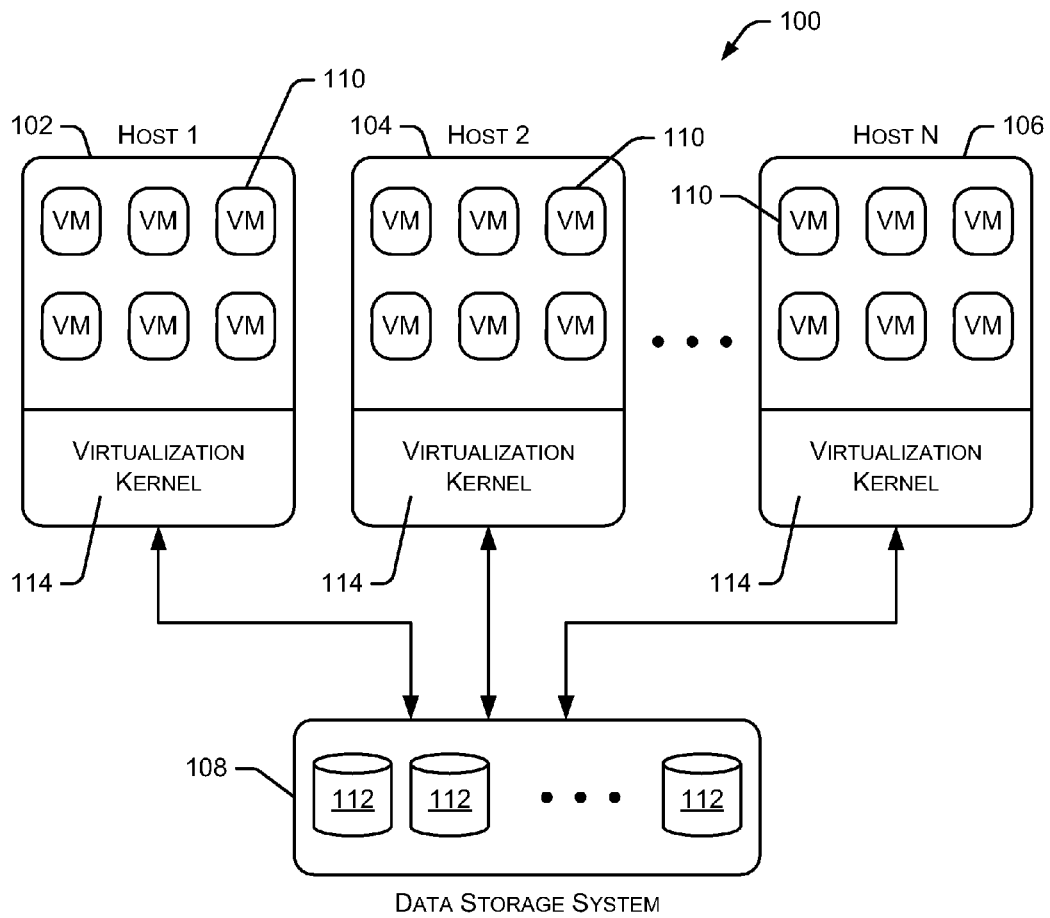
FIG. 1 illustrates an example of an existing virtualized environment including multiple hosts and a shared data storage system.
Figure 2:
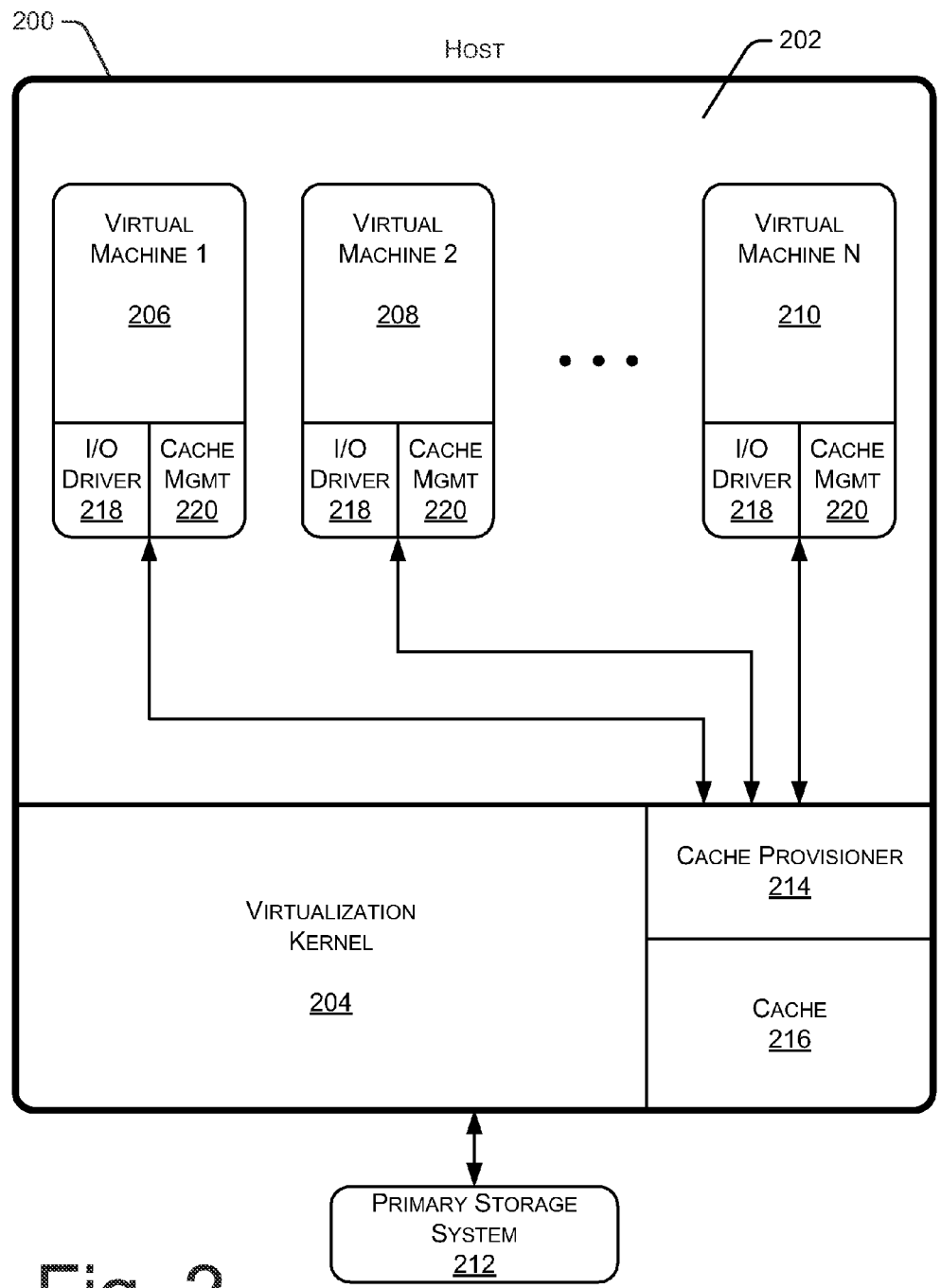
FIG. 2 is a block diagram illustrating example components of a host operating in a virtualized environment.

FIG. 2 is a block diagram illustrating example components of a host 200 operating in a virtualized environment. Host 200 includes a user space 202 and a virtualization kernel 204. User space 202 includes multiple virtual machines 206, 208 and 210, which are also referred to as "guest operating systems". In various implementations, the system shown in FIG. 2 can operate as a "bare metal" system or a virtual system. A bare metal system has an operating system (such as Windows or Linux) that executes directly on hardware. In a bare metal system, virtualization kernel 204 is not present. In a virtual system, a virtual machine executes on a virtualization kernel (e.g., virtualization kernel 204). The terms "virtual machine" and "guest OS" (guest operating system) are used interchangeably herein. A bare metal system includes a "base operating system" instead of a virtual machine.

Each virtual machine 206-210 can implement a different operating system, such as Windows, Linux, and so forth. In a particular embodiment, host 200 is a computing device capable of hosting the multiple virtual machines 206-210 and supporting the applications executed by the virtual machines and the functions associated with those applications. Host 200 includes, for example, one or more processors, memory devices, communication devices, I/O interfaces, and related components. Although three virtual machines 206-210 are shown within host 200, a particular embodiment may include any number of virtual machines.

Virtualization kernel 204 manages the operation of virtual machines 206-210 as well as other components and services provided by host 200. For example, virtualization kernel 204 handles various I/O operations associated with a primary storage system 212 or other storage devices. Primary storage system 212 is shared among the multiple virtual machines 206-210, and may be shared by multiple hosts. In a particular embodiment, primary storage system 212 includes multiple disk drives or other storage devices, such as storage arrays.

Host 200 also includes a cache provisioner 214 and a cache 216 containing one or more memory devices, such as flash memory devices or RAM. A flash memory device is a non-volatile memory that can be repeatedly erased and reprogrammed. A cache memory constructed using flash memory may also be referred to as a solid state drive (SSD). Cache 216 is managed by cache provisioner 214 to dynamically provision capacity and IOPS to virtual machines 206-210. Cache provisioner 214 allows multiple virtual machines to share the same cache without risk of having two virtual machines access the same cache page. Additional details regarding the operation of cache provisioner 214 and cache 216 are discussed herein.

Each virtual machine 206-210 includes an I/O driver 218 and a cache management system 220 N also referred to as a CFS (Cache File System). I/O driver 218 intercepts I/O operations generated by the associated virtual machine and directs the I/O operation to cache provisioner 214 for processing. I/O driver 218 is particularly effective at intercepting I/O operations due to its location within the virtual machine and its close proximity to the source of the data associated with the I/O operation. I/O driver 218 may also be referred to as a "device driver". In a particular embodiment, the I/O drivers are included with an operating system. For example, each device comes with its own device driver. These device drivers have a generic component that is a part of the operating system and there is a device-specific component that is typically supplied by the device vendor. In a particular embodiment, the I/O drivers discussed herein are implemented on top of both these drivers. These I/O drivers are in the path of the device driver and intercept well known I/O APIs that are published by the operating system. This architecture is often referred to as a filter driver. In a particular implementation, this is referred to as a filter driver that sits above standard device drivers for I/O operations.

Cache management system 220 contained in each virtual machine interacts with cache provisioner 214 and other components to manage access to cache 216. For example cache management system 220 includes multiple cache tags that are used in associating an address in a virtual machine with a physical address in cache 216. Cache provisioner 214 manages the storage capacity of cache 216 by, for example, allocating cache space among the multiple virtual machines 206-210, as discussed herein. The allocation information associated with a particular virtual machine is communicated to the cache management system in that virtual machine.

Additional details regarding the operation of I/O driver 218 and cache provisioner 214 as well as the use of cache tags 220 are provided below.

In a particular embodiment, each virtual machine 206-210 represents a virtual desktop, such as a desktop environment associated with a particular user. In this embodiment, the user accesses the desktop environment via a terminal or other system. This desktop environment is commonly referred to as VDI (Virtual Desktop Infrastructure). Thus, a single host can replace hundreds or more individual desktop computing systems. In another embodiment, each virtual machine 206-210 represents a server application. In this embodiment, a single host can replace any number of individual software or application servers running multiple server applications.

Figure 3:
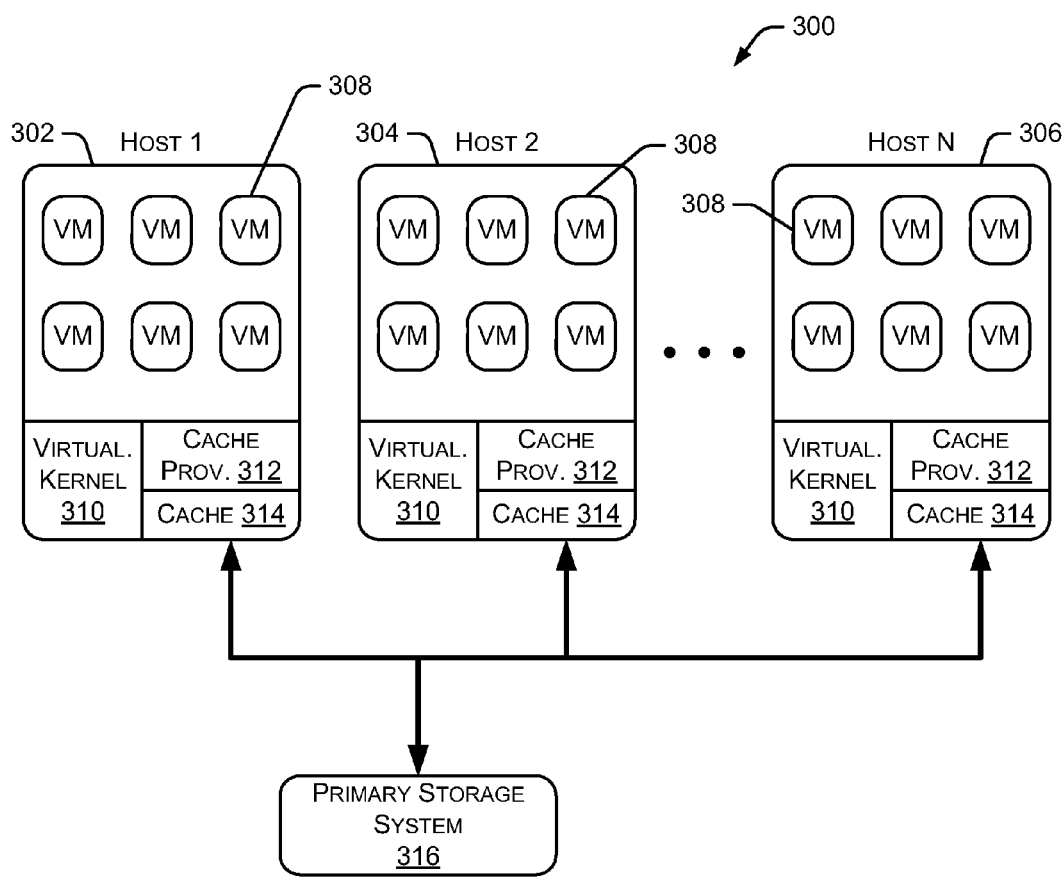
FIG. 3 illustrates an example virtualized environment containing multiple hosts and shared data storage systems.

FIG. 3 illustrates an example virtualized environment 300 containing multiple hosts and shared data storage systems. Virtualized environment 300 includes three host systems 302, 304, and 306, each of which contains multiple virtual machines 308. Although not shown in FIG. 3, each virtual machine 308 includes an I/O driver similar to I/O driver 218 and a cache management system 220 shown in FIG. 2. Each host system 302-306 includes a virtualization kernel 310 and a cache provisioner 312 (labeled "Cache Prov."), similar to those discussed above with respect to FIG. 2. Additionally, each host system 302-306 includes a cache 314, similar to cache 216 discussed with respect to FIG. 2. Although three host systems 302-306 are shown in virtualized environment 300, a particular embodiment may include any number of host systems.

Virtualized environment 300 also includes a primary storage system 316 that is shared among the multiple host systems 302-306 and the multiple virtual machines 308 in those host systems. In a particular embodiment, primary storage system 316 includes multiple disk drives or other storage devices.

Figure 4:
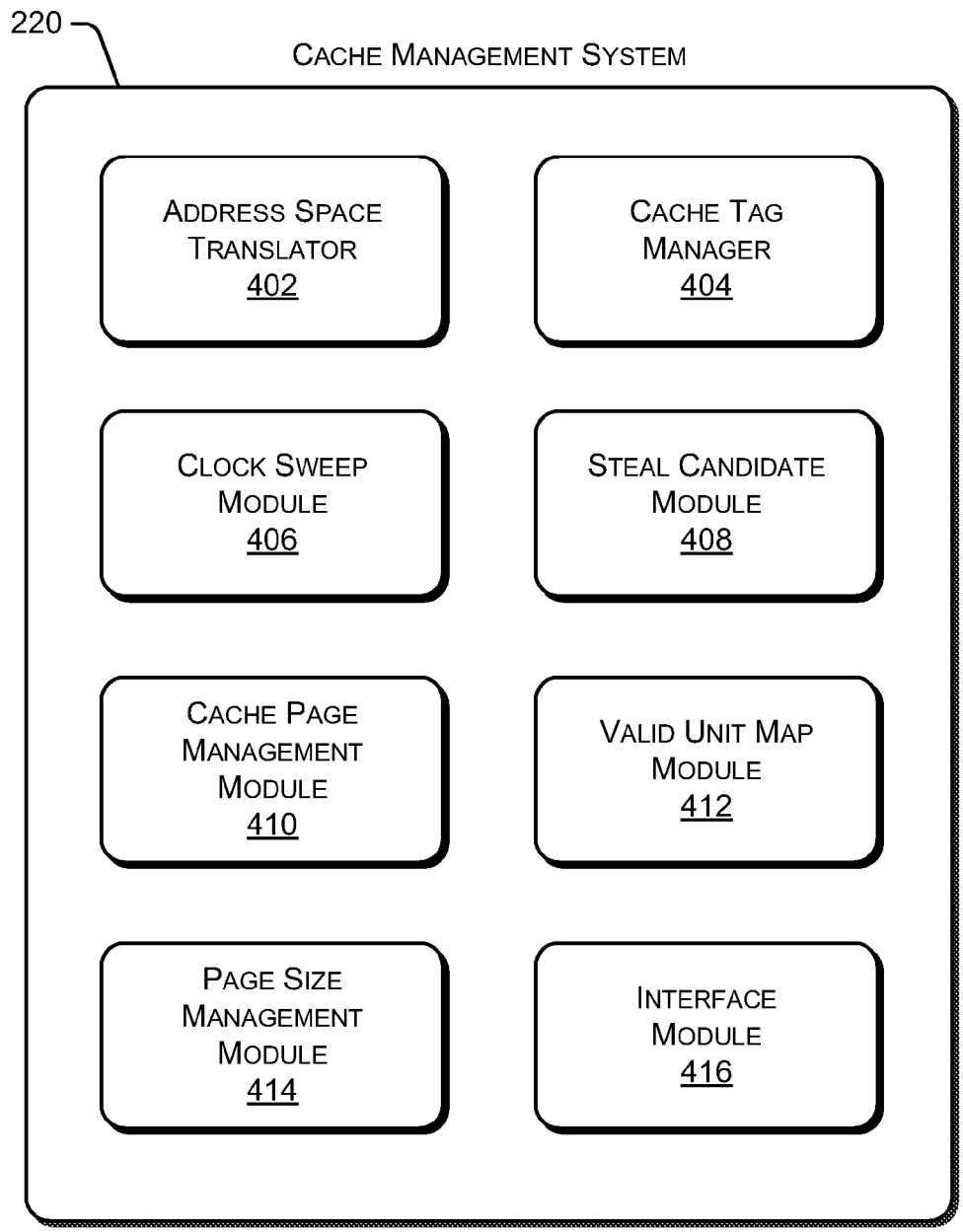
FIG. 4 is a block diagram illustrating example components of a cache management system.

FIG. 4 is a block diagram illustrating example components of cache management system 220 (shown in FIG. 2). Cache management system 220 includes an address space translator 402 that correlates addresses in a primary storage system with storage locations in a cache. A cache tag manager 404 performs various operations associated with a cache and related cache tags, as described herein. A clock sweep module 406 performs various operations associated with the clock hand sweep timer discussed below.

Cache management system 220 also includes a steal candidate module 408 that identifies stored cache data that are candidates for removal from the cache. A cache page management module 410 manages various cache page data and related operations. A valid unit map module 412 identifies valid data stored in a cache and/or a primary storage system. A page size management module 414 performs various page size analysis and adjustment operations to enhance cache performance. Finally, an interface module 416 allows cache management system 220 to interact with other components, devices and systems.

Figure 5:
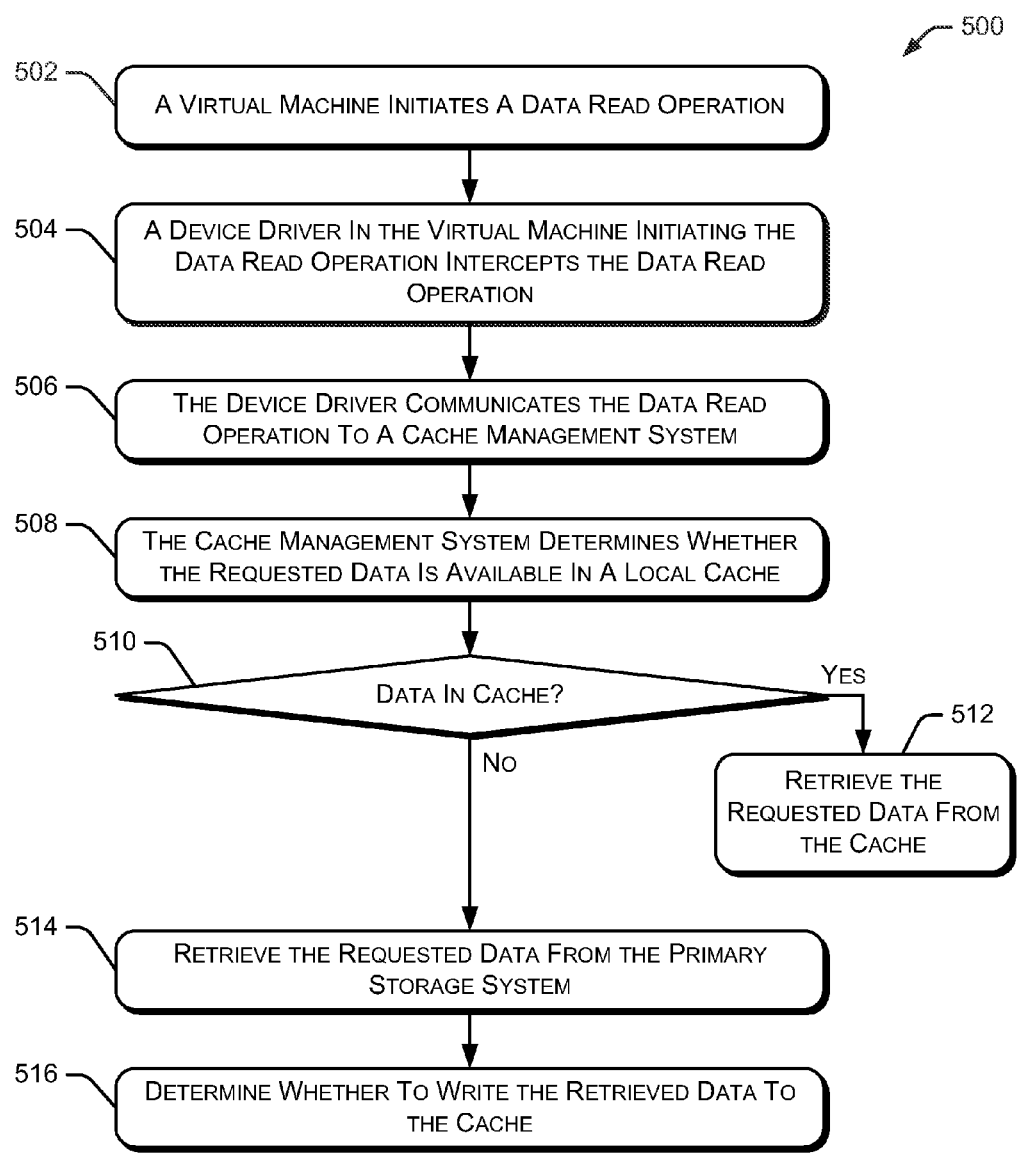
FIG. 5 is a flow diagram illustrating an embodiment of a procedure for implementing a data read operation.

FIG. 5 is a flow diagram illustrating an embodiment of a procedure 500 for implementing a read operation. Initially, a virtual machine initiates a data read operation (block 502). A device driver, such as an I/O driver, in the virtual machine that initiated the data read operation intercepts the data read operation (block 504). The device driver communicates the data read operation to a cache management system (block 506). In alternate implementations, the cache provisioner is located in a different host or in a different component or system.

Procedure 500 continues as the cache management system determines whether the requested data is available in the cache (block 508), such as cache 216 or 314. If the data is determined to be in the cache (block 510), the procedure branches to block 512, where the requested data is retrieved from the cache. If the data is not available in the cache, the procedure branches to block 514, where the requested data is retrieved from the primary storage system, such as primary storage system 212 or 314 discussed above. After retrieving the requested data from the primary storage system, the procedure determines whether to write the retrieved data to the cache (block 516) to improve the storage I/O performance of the virtual machine. This determination is based on various cache policies and other factors.

Cache Management System

The cache management system discussed herein (also referred to as a "Cache File System or CFS") treats the flash memory devices as a cache, but uses a file system model. The cache management system develops and maintains a working set for the cache. In general, the working set is the set of data that should be contained in the cache to support optimal performance of the host and its supported virtual machines.

As mentioned above, the cache is created using flash memory devices. These devices typically provide fast read operations, but slow write operations. These slow write operations can result in a significant delay when initially developing the working set for the cache. Additionally, flash devices can generally accept a limited number of write operations. After reaching the "write lifetime" of the flash device, portions of the flash device become unusable and the integrity of the device begins to deteriorate. These characteristics of flash devices are taken into consideration by the cache management system when managing the cache.

Figure 6:
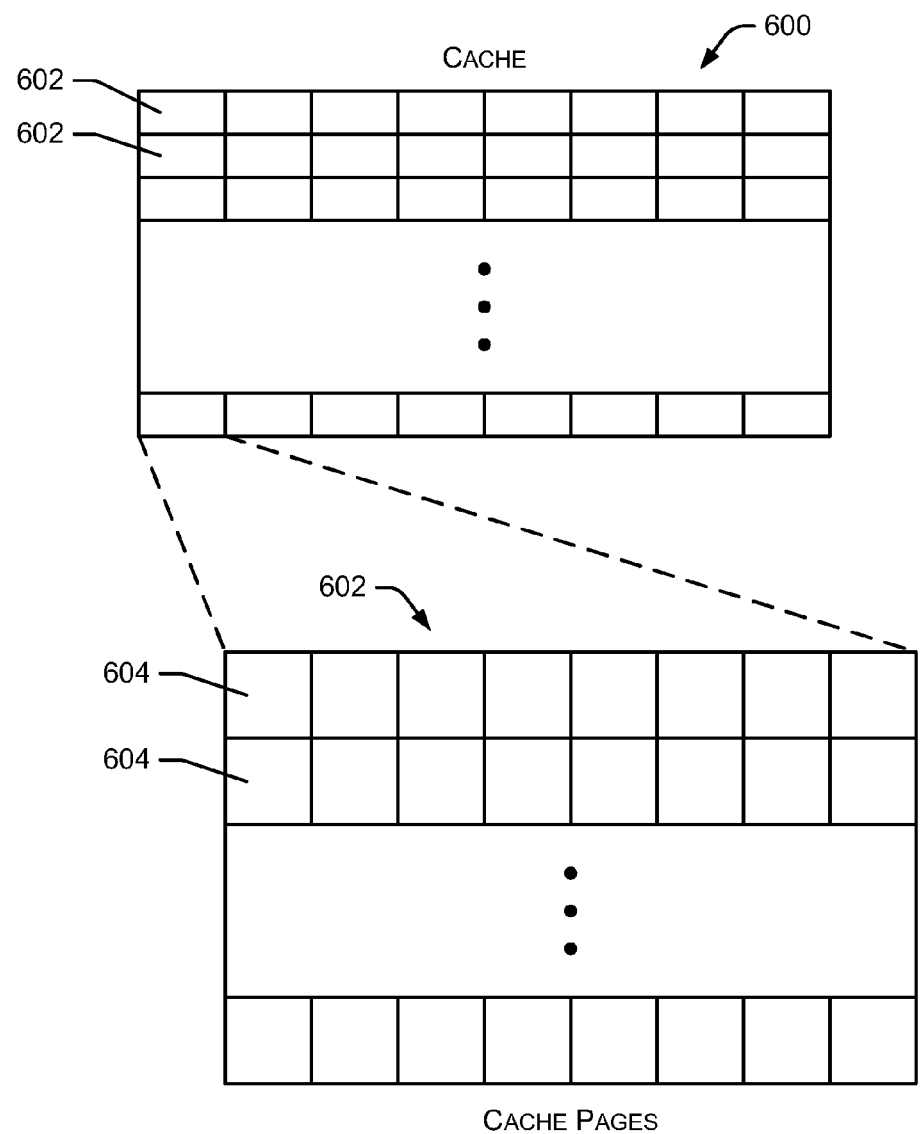
FIG. 6 illustrates an example structure of a data cache and associated cache pages contained in the data cache.

FIG. 6 illustrates an example structure of a cache 600 and associated cache pages contained in the cache. Cache 600 is broken in to multiple chunks 602. A cache can divided into any number of chunks having any size. In a particular embodiment, each chunk 602 contains 256 MB (megabytes) of memory storage. In this embodiment, the number of chunks depends on the cache capacity. For example, a 1 TB (terabyte) cache divided into 256 MB chunks, and contains 4192 chunks. As shown in FIG. 6, each chunk 602 is divided into multiple cache pages 604.

Cache chunks 602 are assigned to virtual machines based on the cache needs of each virtual machine. The number of chunks 602 assigned to a particular virtual machine can change over time as the cache needs of the virtual machine changes. The number of chunks 602 assigned to a specific virtual machine defines the cache capacity of that virtual machine. For example, if two 256 MB chunks are assigned to a specific virtual machine, that virtual machine's cache capacity is 512 MB. The assignment of chunks 602 to particular virtual machines is handled by the cache provisioner.

Cache tags are used in mapping storage I/O addresses in a virtual machine to actual cache pages 604 (e.g., physical addresses in the cache). The cache tags can cache data associated with any storage device assigned to a virtual machine. These cache tags perform translations between the address of blocks on the storage device (e.g., the primary storage system) and a cache address. Cache tags are organized linearly in RAM or other memory. This allows the address of the cache tag to be used to locate a physical cache page because of the algorithmic assumption that each cache tag has a linear 1:1 correspondence with a physical cache page.

As shown in FIG. 2, cache tags 220 associated with a particular virtual machine are stored within that virtual machine. The cache tags contain metadata that associates storage I/O addresses to specific cache pages in the cache. In a particular embodiment, each cache tag is associated with a particular page in the cache.

In a particular embodiment, a "thin provisioning" approach is used when allocating cache chunks to the virtual machines. In this embodiment, each virtual machine is allocated a particular number of cache chunks, as discussed above. However, the entire cache capacity is "published" to each of the virtual machines. For example, if the total cache size is 1 TB, each virtual machine believes is has access to the entire 1 TB of storage space. However, the actual allocation of cache chunks is considerably smaller (e.g., 256 MB or 512 MB) N based on the current needs of the virtual machine. The allocated cache chunks represent a specific range of addresses available within the cache. The cache provisioner dynamically changes these cache chunk allocations as each virtual machine's working set requirements change. Regardless of the number of cache chunks actually allocated to a particular virtual machine, that virtual machine believes it has access to the entire 1 TB cache.

Figure 7:
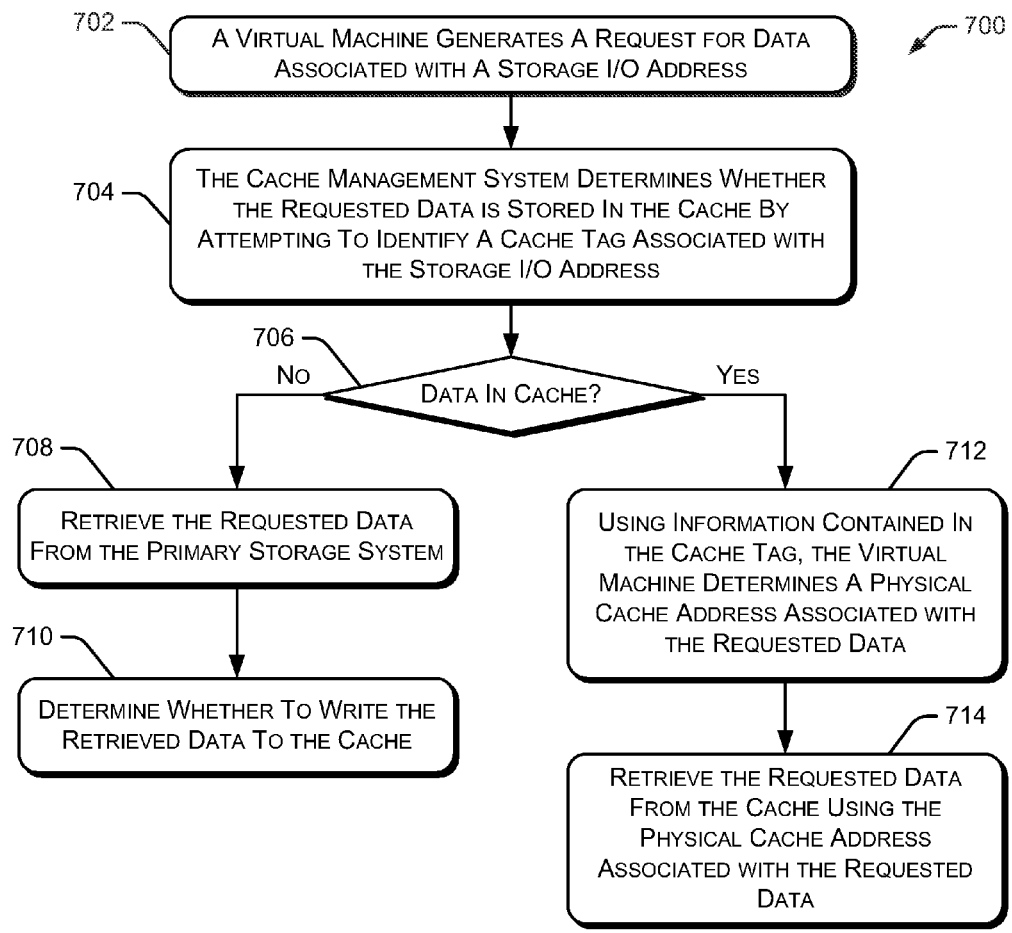
FIG. 7 is a flow diagram illustrating an embodiment of a procedure for implementing a virtual machine read operation using cache tags.

FIG. 7 is a flow diagram illustrating an embodiment of a procedure 700 for implementing a virtual machine read operation using cache tags. Initially, a virtual machine generates a request for data associated with a storage I/O address (block 702). The cache management system (e.g., cache management system 220 shown in FIG. 2) determines whether the requested data is stored in the cache by attempting to identify a cache tag associated with the storage I/O address (block 704). If the requested data is not in the cache (block 706), the requested data is retrieved from the primary storage system (block 708). After retrieving the requested data from the primary storage system, the procedure determines whether to write the retrieved data to the cache (block 710) to improve storage I/O performance of the virtual machine. This determination is based on various cache policies and other factors.

If the decision is to write the retrieved data to the cache, the cache management system uses the memory address of the cache tag to determine a physical cache address associated with the data to be written. The data is then written to the cache using the physical cache address associated with the data.

If the requested data is in the cache (block 706), the cache management system uses the memory address of the cache tag to determine a physical cache address associated with the requested data (block 712). The requested data is then retrieved from the cache using the physical cache address associated with the requested data (block 714).

Storing the cache tag information within the associated virtual machine allows the virtual machine to easily determine where the data is stored physically in the cache without having to access a different system or process. For example, data read operations would experience a significant delay if the virtual machine needed to access the cache tag information from the virtualization kernel or from another system. Instead, the systems and methods described herein allow each virtual machine to quickly access cache tags, which increases the speed and efficiency of the I/O operations. Additionally, the virtual machine typically understands the data it is processing better than other systems. For example, the virtual machine understands the nature and context of the data it is processing. This understanding of the data enhances the development and management of an effective working set. Other systems that are external to the virtual machine may simply see the data as raw data without any context or other understanding. Thus, having the cache tag information stored locally in the virtual machine enhances the operation of the virtual machine and the I/O operations.

Figure 8:
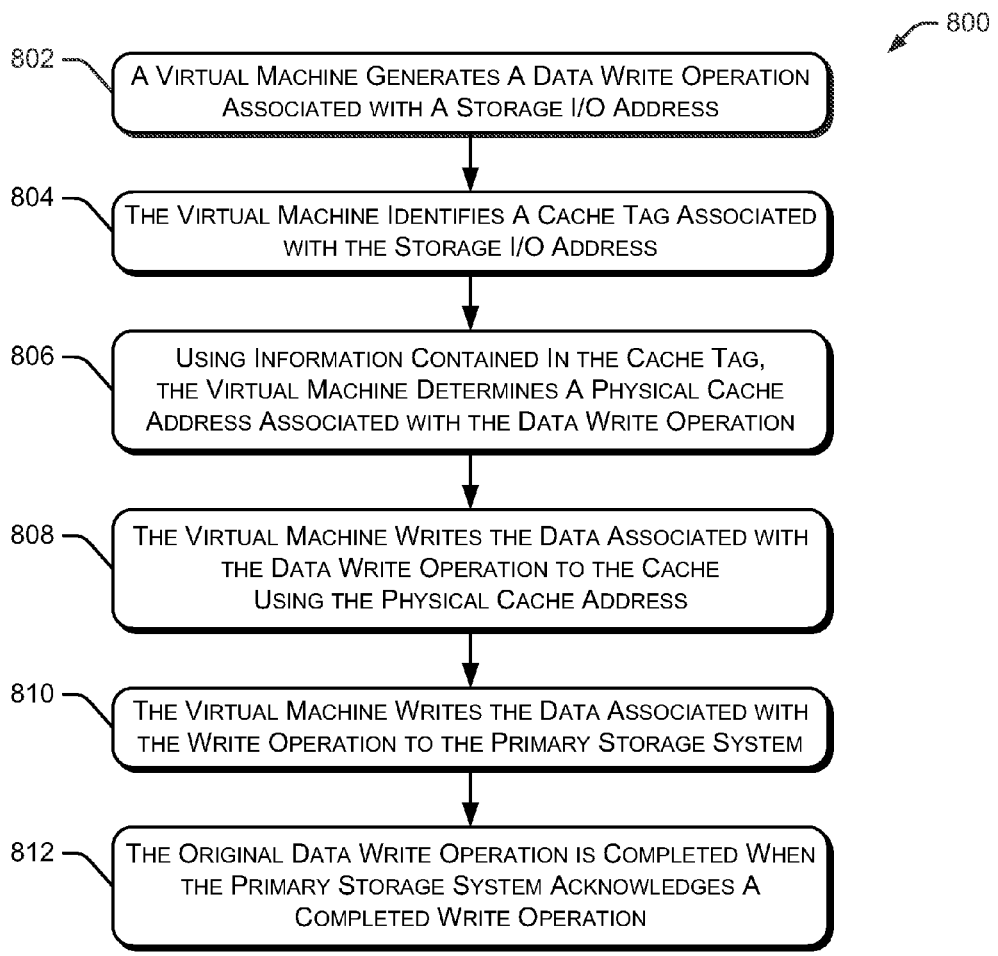
FIG. 8 is a flow diagram illustrating an embodiment of a procedure for implementing a data write operation.

FIG. 8 is a flow diagram illustrating an embodiment of a procedure 800 for implementing a data write operation. Initially, a virtual machine generates a data write operation associated with a storage I/O address (block 802). As discussed herein, the storage I/O address is translated to a physical address in the cache device using the cache tags stored within the cache management system of the virtual machine. The virtual machine identifies a cache tag associated with the storage I/O address (block 804). Using the information contained in the cache tag, the virtual machine determines a physical cache address associated with the data write operation (block 806).

Next, the virtual machine writes the data associated with the data write operation to the cache using the physical cache address (block 808). The virtual machine also simultaneously writes the data associated with the data write operation to the primary storage system (block 810). The original data write operation is completed when the primary storage system acknowledges a completed write operation (block 812).

In a particular implementation, the cache discussed herein is a write-through cache. This type of cache writes data to both the primary storage system and the cache. A write completion is acknowledged after the write operation to the primary storage system is completed, regardless of whether a corresponding write operation to the cache has completed. In specific embodiments, cache write operations can be queued and completed as the cache speed allows. Thus, a cache with a slow write speed (or a queue of pending write operations) does not degrade performance of the overall system. Cache tags associated with incomplete or queued write operations are identified as "pending." After the write operation completes, the associated cache tag is identified as "valid". When the cache tag is identified as "pending," any attempted read of the data associated with the cache tag results in a cache miss, causing retrieval of the requested data from the pending memory buffer associated with the I/O, or from the primary storage system.

Increasing Cache Tags Beyond Available Pages to Detect Cache Capacity Misses

As mentioned above, each cache tag stored in a virtual machine is associated with a particular cache page. Additionally, the systems and methods described herein are capable of dynamically allocating cache resources (e.g., cache chunks) to the virtual machines in a virtualized environment. Using the features of the present invention, the number of cache tags associated with a particular virtual machine can be increased beyond the number of cache pages actually associated with the virtual machine. This increase in cache tags allows the cache management system to determine whether increasing the number of cache pages assigned to the particular virtual machine will likely improve the cache hit rate for that virtual machine. In other words, the systems and procedures described herein assist in determining cache misses caused by limited cache storage capacity. Specifically, this allows us to determine cache capacity misses.

Figure 9:
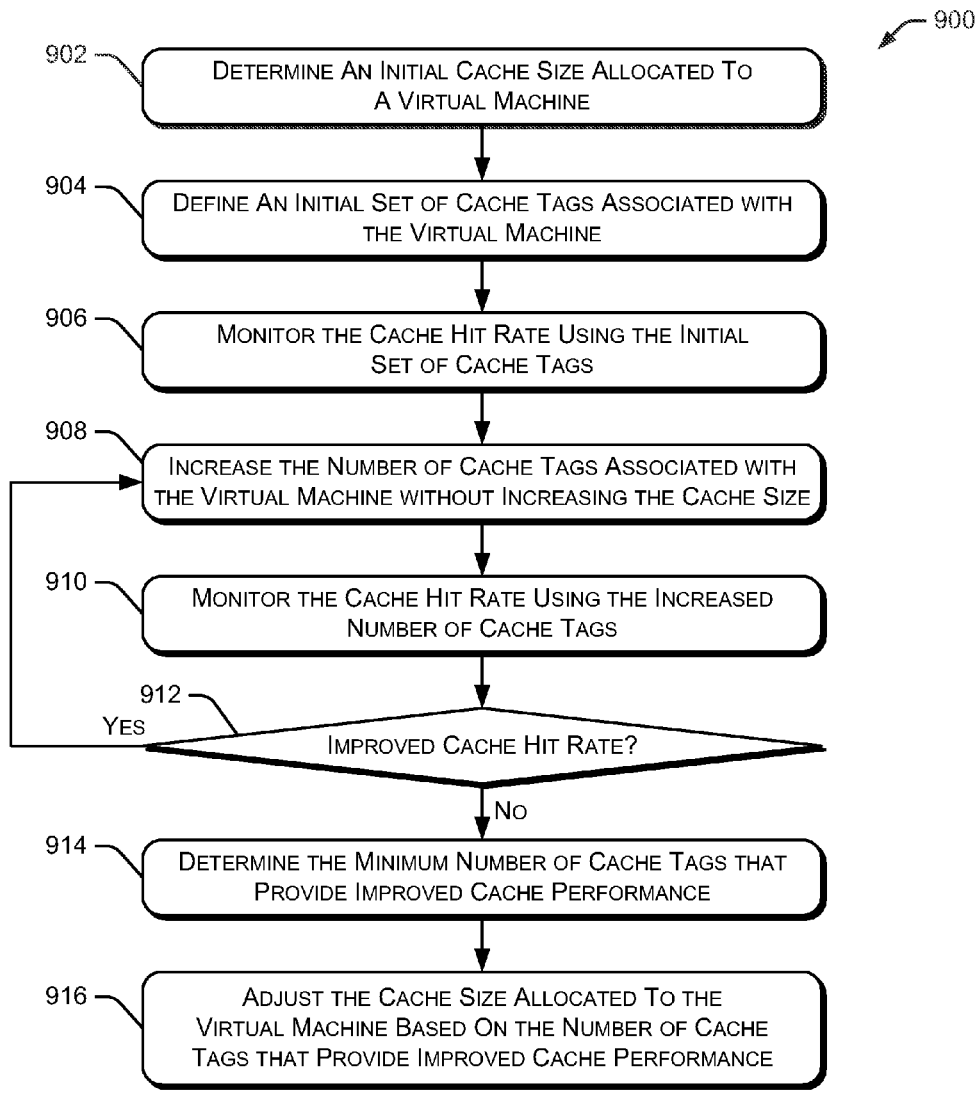
FIG. 9 is a flow diagram illustrating an embodiment of a procedure for allocating cache resources to a virtual machine.

FIG. 9 is a flow diagram illustrating an embodiment of a procedure 900 for allocating cache resources to a virtual machine. In a particular embodiment, procedure 900 is performed as part of a "profiler" process that analyzes data associated with a particular system. Initially, the procedure determines an initial cache size allocated to a virtual machine (block 902). The procedure then defines an initial set of cache tags associated with the virtual machine (block 904). The number of cache tags in this initial set corresponds to the initial cache size allocated to the virtual machine. The cache management system monitors the cache hit rate using the initial set of cache tags (block 906).

The procedure increases the number of cache tags associated with the virtual machine without increasing the cache size (block 908). For example, the procedure may increase the number of cache tags by an amount that corresponds to assigning an additional cache chunk to the virtual machine. However, the additional cache chunk is not actually assigned to the virtual machine at this point in the evaluation procedure. Next, procedure 900 monitors the cache hit rate using the increased number of cache tags (block 910). After monitoring the cache hit rate with the increased number of cache tags for a period of time, the procedure determines whether the cache hit rate has improved (block 912). If the cache hit rate has improved as a result of the additional cache tags, the procedure returns to block 908 to further increase the number of cache tags associated with the virtual machine.

The process of increasing the number of cache tags and monitoring the results continues until the increase in cache tags does not improve the cache hit rate. At this point, procedure 900 determines the minimum number of cache tags that provide improved cache performance (block 914). In an alternate embodiment, the procedure determines an optimal number of cache tags that provide optimal cache performance. The procedure then adjusts the cache size allocated to the virtual machine based on the number of cache tags that provide improved cache hit rate performance (block 916). Dynamic addition of cache chunks or capacity to a virtual machine is based on both the hit rate and other policy that handles cache resource provisioning to other virtual machines. The hit rate, IOPS improvements, and cache capacity are also adjusted using policy that can be controlled by the user or implemented algorithmically based on rules specified by the user.

In a particular embodiment, the number of cache tags added at block 908 is substantially the same as the number of the cache pages in a particular cache chunk. Thus, allocating additional cache resources to the virtual machine is performed by allocating a number of cache chunks that corresponds to the minimum number of cache tags that provide improved cache performance.

Clock Hands Data

FIG. 10 illustrates example clock hand data values 1000 associated with a cache tag over time. The clock hand data values utilize two bits of information for each clock hand. In the example of FIG. 10, which includes two clock hands, a total of four bits are used. Thus, the memory usage to store these bits of data is considerably less than other systems that use pointers and other data structures requiring significant amounts of storage space.

Each clock hand has a different time interval. In the example of FIG. 10, one clock hand has a time interval of ten minutes and the other clock hand has an interval of one hour. The time interval associated with each clock hand indicates the frequency with which the clock hand "sweeps" the clock hand data bits. For example, a clock hand with a time interval of ten minutes clears one of the two clock hand data bits every ten minutes. Each time a cache page is accessed (a cache hit), all clock hand bits associated with the cache page are reset to a value of "1".

As shown in FIG. 10, all clock hand bits are initially set to "1" (e.g., at time 00:00). After the first ten minute clock sweep, Bit 2 of clock hand 1 is cleared to "0". The clock hand bits associated with the one hour clock hand are unchanged because the one hour clock sweep has not yet occurred. In this example, the ten minute clock sweep occurs at time 00:08, which is less than ten minutes. This occurs because the initial time (00:00) is not necessarily aligned with a clock sweep time.

After a second ten minute clock sweep without any access of the cache page, the Bit 1 of clock hand 1 is cleared, leaving a clock hand value of "00". At this time, the cache page associated with this example is identified as a "steal" candidate; i.e., the cache page is a candidate for removal from the cache due to a lack of access of the cache page data. A separate table or other listing is maintained for cache pages in which both clock hands have been cleared. Cache pages with both clock hands cleared are top candidates for "steal" prior to cache pages with only one clock hand cleared.

As shown in FIG. 10, if a cache page data access occurs at time 00:22, all clock hand bits are set to "1". At time 00:31, the one hour clock hand sweeps, causing the clearing of Bit 2 of clock hand 2. That bit is set (along with setting all other clock hand bits) at time 01:04 due to a cache page data access. Although the particular example of FIG. 10 uses two clock hands with ten minute and one hour intervals, alternate embodiments may use any number of clock hands, each having any time interval.

Figures 11, 12:
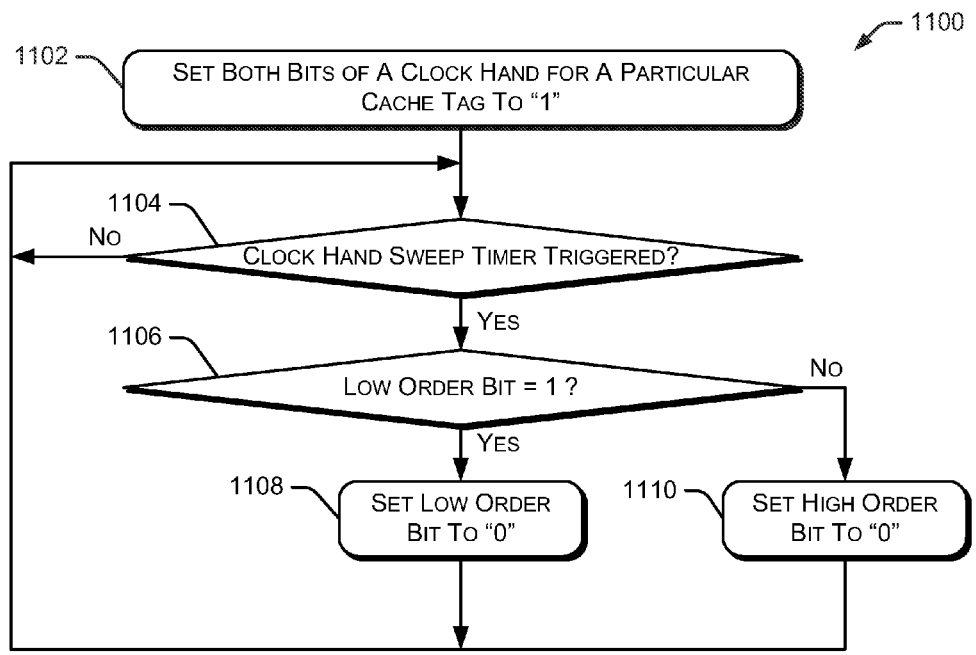
FIG. 11 is a flow diagram illustrating an embodiment of a procedure for managing clock hand data associated with a cache tag.
FIG. 12 illustrates an example cache tag data structure.

FIG. 11 is a flow diagram illustrating an embodiment of a procedure 1100 for managing clock hand data associated with a cache tag. In a particular embodiment, procedure 1100 is performed by each virtual machine in a host. Initially, both bits of a clock hand for a particular cache tag are set to "1" (block 1102). The procedure continues by determining whether a clock hand sweep timer has triggered (block 1104). In a particular embodiment, a separate thread is dedicated to the clock hand sweep. That thread has an associated timer that triggers at each clock sweep interval. If a clock hand sweep timer triggers, the procedure determines whether a low order bit associated with the clock hand is "1" (block 1106). If so, the low order bit is set to "0" (block 1108). If, at block 1106, the low order bit was already set to "0", the procedure branches to block 1110, which sets the high order bit to "0". Procedure 1100 then returns to block 1104 to continue monitoring for the triggering of the clock hand sweep timer.

Dynamic Cache Tag Data Structure

FIG. 12 illustrates an example cache tag data structure. The size of several fields in the cache tag are dynamic. Thus, the entire cache tag data structure size is dynamic. A cache tag provides a translation between a storage I/O address and a physical address in the cache. The cache tag data structure shown in FIG. 12 includes a next cache tag index that is fixed in size which is used to link cache tags in the hash table. In operation, the next cache tag index is converted to a memory address to find the next cache tag linked to the current cache tag. A state field is fixed in size and identifies a current state of the cache tag. Example state transition diagrams are discussed below with respect to FIG. 13. The clock hands field is a dynamic field and indicates the number of clock hands (e.g., the number of time intervals) associated with the cache tag. The checksum field is a dynamic field that varies in size based on the size of the cache page and the level of integrity desired by the user. A user can determine the strength of the checksum. For example, a user can obtain a higher level of integrity for the checksum by allocating more bits of memory to the checksum.

Finally, the cache tag data structure includes a valid unit map field is a dynamic field that identifies which units in a page are cached. An example of a unit within a cache page is a sector. For example, a particular page may have one or more sectors that are missing or no longer valid. The valid unit map identifies the status of all units associated with a particular cache page to prevent accessing data in units that is not valid.

Figure 13:
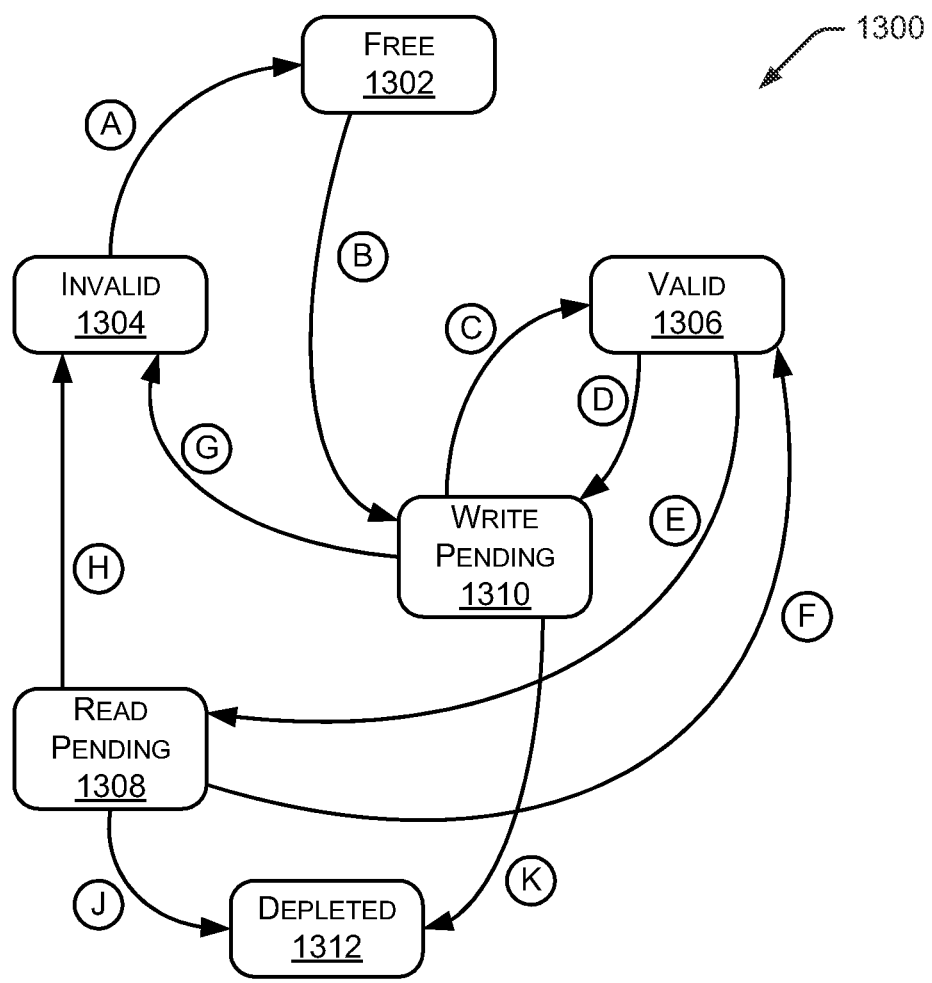
FIG. 13 illustrates an example state transition diagram.

FIG. 13 illustrates an example state transition diagram 1300 associated with the operation of the systems and methods described herein. State transition diagram 1300 includes multiple states: a Free state 1302, an invalid state 1304, a valid state 1306, a read pending state 1308, a write pending state 1310, and a depleted state 1312. In one embodiment, these various states 1302-1312 are associated with data stored in a cache. The transitions between states 1302-1312 are identified by letters (illustrated in circles) in FIG. 13. Transition B (from free state 1302 to write pending state 1310) occurs upon initiation of a cache write operation or a cache read update. Transition C occurs when a cache write or cache read operation is completed successfully. Transition D occurs upon initiation of a cache write operation or a cache read update. Transition E occurs upon initiation of a cache read operation. Transition F occurs upon successful completion of a cache read operation. Transition G occurs when a concurrent write operation occurs before an earlier cache write operation or cache read update completed. Transition H occurs when a concurrent write operation occurs before an earlier read operation completes. Transition A (from invalid state 1304 to free state 1302) occurs when the first cache write or read update is completed successfully. Transition J occurs when a cache read operation fails. Transition K occurs when a cache write operation or a read update fails.

Managing Multiple Cache Page Sizes

As discussed above, cache chunks (and corresponding cache tags) are allocated dynamically among multiple virtual machines. The allocation is dynamic due to changes in data storage requirements, changes in applications executing on the virtual machines, and the like.

In a particular implementation of the systems and methods described herein, the cache supports multiple page sizes. Different applications executing in the virtual environment may require different page sizes to function properly. For example, some applications always perform 32K data I/O operations. For these applications, it is desirable to use a large cache page size, such as 16K or 32K, to minimize the number of data I/O operations necessary to handle the 32K of data. For example, if the cache page size is 4K and the application performs a 32K data I/O operation, eight cache pages must be accessed to read or write the 32K of data. Performing eight separate I/O operations to accommodate the 32K of data is a burden on system resources and dramatically increases the number of I/O operations that must be processed by the system. In contrast, if the cache page size is 16K, only two I/O operations are required to process the 32K of data. Thus, the larger cache page size reduces I/O operations and the corresponding burden on system resources.

Using larger cache page sizes also reduces the number of cache tags, thereby reducing the memory space required to store the cache tags. For example, in a one terabyte cache having 4K cache pages, 256M cache tags are necessary to provide a single cache tag for each cache page. In the same system using 16K cache pages, 64M cache tags are needed. Thus, the larger cache page size reduces the number of cache tags and the memory resources needed to store the cache tags.

Although larger cache page sizes can reduce I/O operations and reduce the number of cache tags, in certain situations a larger cache page size can result in underutilized cache resources. For example, if a system is using a 32K cache page size and an application performs a 4K I/O operation, only a small fraction of the 32K page is used (28K of the page is not needed). This situation results in significant unused cache resources. Therefore, the systems and methods described herein support multiple cache page sizes to improve utilization of system resources, such as I/O resources and cache storage resources.

Different applications have different data storage characteristics. Applications can be characterized as having "sparse address spaces" or "dense address spaces". Sparse address spaces tend to have scattered data with significant gaps between different groupings of data. In contrast, dense address spaces tend to have data that is more compact with fewer (or smaller) gaps between different groupings of data. When selecting cache page sizes for a particular virtual environment, it is important to consider the data storage characteristics (e.g., sparse or dense address spaces) associated with applications executing in the virtual environment. There can be exceptions where a sparse address space may comprise groups of contiguous data where the groups are sparsely located. In such cases one can use large pages even though the address space is sparse.

In a particular embodiment, data associated with existing applications can be analyzed prior to implementing a system or method of the type described herein. This prior analysis allows the system to be "tuned" based on typical application data. After the systems and methods are implemented, the dynamic nature of the system adjusts cache page sizes, cache allocations, system resources, and other parameters based on changes in the operation of the application.

In a particular implementation, a cache is divided into multiple sections such that each section supports different page sizes. For example, a cache may be divided into four sections, two of which support 4K cache pages, one that supports 16K cache pages, and one that supports 32K cache pages. The cache pages in these different sections are allocated to different virtual machines and different applications based, for example, on the data storage characteristics of the applications.

In one embodiment, different hash tables are used for different cache page sizes. Each hash table has its own associated hash function that identifies a particular hash slot in the table based on an address provided to the hash function. When using multiple hash tables, such as a 4K hash table and a 16K hash table, the systems and methods perform a lookup operation for each hash table. Performing a lookup in both hash tables is necessary because a 4K address could be contained within a 16K entry in the 16K hash table. To enhance the lookup process, the systems and methods described herein apply one or more algorithms based on a percentage of cache hits associated with different cache page sizes, a success rate associated with different hash tables, and other factors.

In a particular implementation, an algorithm uses both the percentage of cache hits associated with cache page sizes and the success rate associated with different hash tables to search for data in a cache.

In other embodiments, the systems and methods use a single hash table associated with the smallest cache page size, such as 4K. Although the cache supports multiple cache page sizes, the hash table uses a 4K page size exclusively. This approach eliminates the need to perform a lookup in multiple hash tables associated with different cache page sizes. In this scheme a 16K page would require 4 hash table lookups and groups of cache tags are managed as one.

Cache Tag Management

In certain situations, it is desirable to prevent one or more cache pages from being deleted, replaced or modified. This is accomplished in the systems and methods discussed herein by "pinning" the cache tags associated with the cache pages that are to be protected from deletion or modification. Cache tags are pinned by setting the state bit to "pinned state" in the cache tag.

Pinning cache tags is used in a variety of situations. For example, a system may "freeze" a group of cache tags associated with a virtual machine and move the cache tags to a persistent storage device to preserve the virtual machine's working set. Later, when the virtual machine "warms up", the cache tags are retrieved from the persistent storage device, actual data is read back from the primary or shared storage, thereby recreating the working set. This allows the virtual machine to resume operation immediately with a fully functioning working set, rather than taking a significant period of time recreating the working set.

Pinning cache tags are also useful to lock a range of addresses in the cache. For example, a user can pin specific data within the cache to prevent the data from being replaced or modified. The user may know that the specified data is critical to the operation of the virtual machine and wants to ensure that the data is always available in the cache.

In certain situations, a portion of data associated with a read operation is available in the cache, but a portion is not available (or not valid) in the cache. In these situations, the system must decide whether to retrieve all of the data from the primary storage system or retrieve a portion from the cache and the remainder from the primary storage system. The decisions involving what's available in the cache can result in more than 1 I/O to primary or shared storage (which is usually more efficient when doing sequential I/Os). Our algorithms have the ability to control the amount of fragmentation of I/Os to primary storage based on its I/O characteristics.

In a particular embodiment, a checksum is calculated for each cache page. When calculating the checksum, the system only performs the calculation on the valid data, based on a valid unit map (e.g., the valid data sectors). When a write operation is performed that increases the number of valid data sectors, the checksum is recalculated to include the new valid data sectors.

Figure 14:
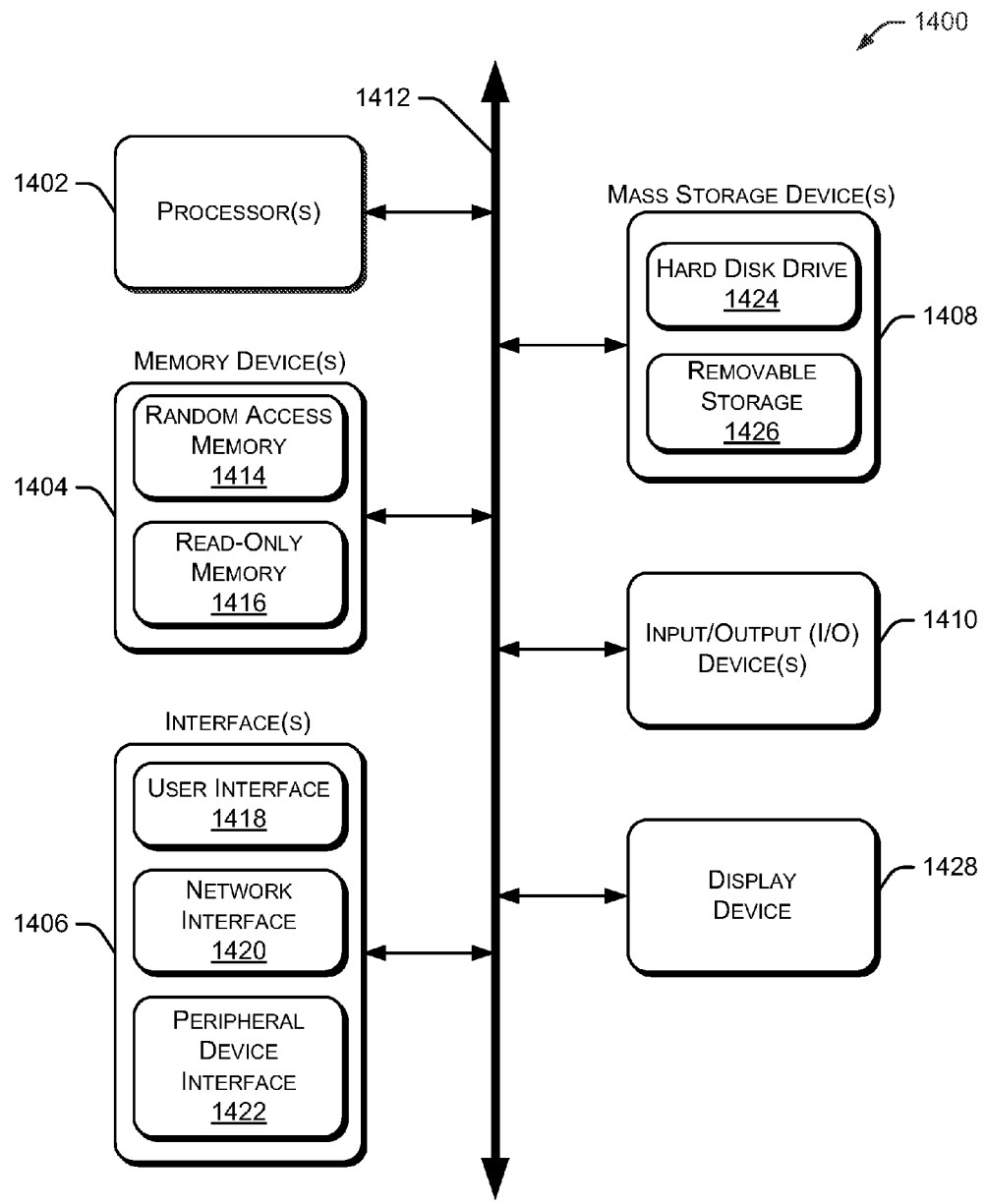
FIG. 14 is a block diagram illustrating an example computing device.

FIG. 14 is a block diagram illustrating an example computing device 1400. Computing device 1400 may be used to perform various procedures, such as those discussed herein. Computing device 1400 can function as a server, a client, or any other computing entity. Computing device 1400 can be any of a wide variety of computing devices, such as a desktop computer, a notebook computer, a server computer, a handheld computer, and the like.

Computing device 1400 includes one or more processor(s) 1402, one or more memory device(s) 1404, one or more interface(s) 1406, one or more mass storage device(s) 1408, one or more Input/Output (I/O) device(s) 1410, and a display device 1428 all of which are coupled to a bus 1412. Processor (s) 1402 include one or more processors or controllers that execute instructions stored in memory device(s) 1404 and/or mass storage device(s) 1408. Processor(s) 1402 may also include various types of computer-readable media, such as cache memory.

Memory device(s) 1404 include various computer-readable media, such as volatile memory (e.g., random access memory (RAM)) 1414 and/or nonvolatile memory (e.g., read-only memory (ROM)) 1416. Memory device(s) 1404 may also include rewritable ROM, such as Flash memory.

Mass storage device(s) 1408 include various computer readable media, such as magnetic tapes, magnetic disks, optical disks, solid state memory (e.g., Flash memory), and so forth. As shown in FIG. 14, a particular mass storage device is a hard disk drive 1424. Various drives may also be included in mass storage device(s) 1408 to enable reading from and/or writing to the various computer readable media. Mass storage device(s) 1408 include removable media 1426 and/or non-removable media.

I/O device(s) 1410 include various devices that allow data and/or other information to be input to or retrieved from computing device 1400. Example I/O device(s) 1410 include cursor control devices, keyboards, keypads, microphones, monitors or other display devices, speakers, printers, network interface cards, modems, lenses, CCDs or other image capture devices, and the like.

Display device 1428 includes any type of device capable of displaying information to one or more users of computing device 1400. Examples of display device 1428 include a monitor, display terminal, video projection device, and the like. Interface(s) 1406 include various interfaces that allow computing device 1400 to interact with other systems, devices, or computing environments. Example interface(s) 1406 include any number of different network interfaces 1420, such as interfaces to local area networks (LANs), wide area networks (WANs), wireless networks, and the Internet. Other interfaces include a user interface 1418 and a peripheral device interface 1422.

Bus 1412 allows processor(s) 1402, memory device(s) 1404, interface(s) 1406, mass storage device(s) 1408, and I/O device(s) 1410 to communicate with one another, as well as other devices or components coupled to bus 1412. Bus 1412 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1400, and are executed by processor(s) 1402. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

As discussed herein, the invention may involve a number of functions to be performed by a computer processor, such as a microprocessor. The microprocessor may be a specialized or dedicated microprocessor that is configured to perform particular tasks according to the invention, by executing machine-readable software code that defines the particular tasks embodied by the invention. The microprocessor may also be configured to operate and communicate with other devices such as direct memory access modules, memory storage devices, Internet-related hardware, and other devices that relate to the transmission of data in accordance with the invention. The software code may be configured using software formats such as Java, C++, XML (Extensible Mark-up Language) and other languages that may be used to define functions that relate to operations of devices required to carry out the functional operations related to the invention. The code may be written in different forms and styles, many of which are known to those skilled in the art. Different code formats, code configurations, styles and forms of software programs and other means of configuring code to define the operations of a microprocessor in accordance with the invention will not depart from the spirit and scope of the invention.

Within the different types of devices, such as laptop or desktop computers, hand held devices with processors or processing logic, and also possibly computer servers or other devices that utilize the invention, there exist different types of memory devices for storing and retrieving information while performing functions according to the invention. Cache memory devices are often included in such computers for use by the central processing unit as a convenient storage location for information that is frequently stored and retrieved. Similarly, a persistent memory is also frequently used with such computers for maintaining information that is frequently retrieved by the central processing unit, but that is not often altered within the persistent memory, unlike the cache memory. Main memory is also usually included for storing and retrieving larger amounts of information such as data and software applications configured to perform functions according to the invention when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. During data storage and retrieval operations, these memory devices are transformed to have different states, such as different electrical charges, different magnetic polarity, and the like. Thus, systems and methods configured according to the invention as described herein enable the physical transformation of these memory devices. Accordingly, the invention as described herein is directed to novel and useful systems and methods that, in one or more embodiments, are able to transform the memory device into a different state. The invention is not limited to any particular type of memory device, or any commonly used protocol for storing and retrieving information to and from these memory devices, respectively.

Embodiments of the systems and methods described herein facilitate the management of data input/output operations. Additionally, some embodiments may be used in conjunction with one or more conventional data management systems and methods, or conventional virtualized systems. For example, one embodiment may be used as an improvement of existing data management systems.

Although the components and modules illustrated herein are shown and described in a particular arrangement, the arrangement of components and modules may be altered to process data in a different manner. In other embodiments, one or more additional components or modules may be added to the described systems, and one or more components or modules may be removed from the described systems. Alternate embodiments may combine two or more of the described components or modules into a single component or module.

Although specific embodiments of the invention have been described and illustrated, the invention is not to be limited to the specific forms or arrangements of parts so described and illustrated. The scope of the invention is to be defined by the claims appended hereto and their equivalents.

The invention claimed is:

1. A method, comprising:
   identifying a data read operation by use of a storage driver of a virtual machine, the data read operation generated by the virtual machine and sent to a primary storage system, wherein the virtual machine is configured for operation within a hypervisor on a host computing device;
   determining, by way of a cache management system operating within the virtual machine, whether data associated with the identified data read operation is available in a cache of the host computing device, wherein the cache is managed by a cache provisioner that is accessible to a plurality of virtual machines operating within the hypervisor; and
   redirecting the identified data read operation to the cache provisioner in response to determining that the data is available in the cache.

2. The method of claim 1, further comprising servicing the identified data read operation by use of data retrieved from the cache of the host computing device.

3. The method of claim 1, wherein the data read operation is identified by use of a device driver configured for operation within a guest operating system of the virtual machine.

4. The method of claim 3, wherein the device driver is an input/output driver.

5. The method of claim 1, further comprising maintaining a set of cache tags within the virtual machine corresponding to cache resources allocated to the virtual machine by the cache provisioner.

6. The method of claim 1, further comprising accessing a cache tag stored in the virtual machine that associates a storage I/O address associated with the data read operation with a cache address.

7. The method of claim 6, wherein cache tags of the virtual machine are stored linearly in random access memory of the virtual machine.

8. The method of claim 6, wherein the cache tag is associated with a particular cache page managed by the cache provisioner.

9. A system, comprising:
   a cache manager configured for operation within a virtual machine, wherein the virtual machine is configured for operation within a hypervisor of a host computing device; and
   an input/output driver configured to operate within the virtual machine, wherein the input/output driver is configured to intercept input/output operations associated with the virtual machine that pertain to a primary storage system, and to send the intercepted input/output operations to the cache manager;
   wherein the cache manager is configured to request data from a cache provisioner managing a data cache configured for operation within the hypervisor in response to intercepted input/output operations of the virtual machine.

10. The system of claim 9, wherein the data cache comprises a flash memory device.

11. The system of claim 9, wherein the data cache comprises a solid state drive.

12. The system of claim 9, wherein the data cache includes volatile memory.

13. The system of claim 9, wherein the cache provisioner is configured to allocate cache resources to each of a plurality of virtual machines operating within the hypervisor of the host computing device.

14. The system of claim 13, wherein the cache manager maintains cache tags in a memory of the virtual machine that associate storage I/O addresses of the primary storage system with cache storage resources allocated to the virtual machine by the cache provisioner.

15. The system of claim 9, wherein the cache management system is configured to send intercepted input/output operations to the cache provisioner operating in the hypervisor for processing.

16. The system of claim 9, wherein the cache provisioner is configured to allocate cache pages of the data cache to a plurality of virtual machines operating within the hypervisor of the host computing device and to communicate information regarding allocated cache resources to each of the plurality of virtual machines.

17. The system of claim 9, wherein the cache provisioner is configured to dynamically provision input/output operation capacity to a plurality of virtual machines operating within the hypervisor of the host computing device.

18. The system of claim 17, wherein the cache provisioner is further configured to communicate information regarding allocated input/output operation capacity to each of the plurality of virtual machines.

19. The system of claim 9, wherein the cache provisioner is configured to allocate cache storage capacity to a plurality of virtual machines operating within the hypervisor of the host computing device, and wherein the cache provisioner is further configured to maintain a listing of valid data of the virtual machines stored in the data cache.

20. The system of claim 9, wherein the cache manager is configured to identify data candidates for removal from the data cache.

21. The system of claim 9, wherein the cache manager comprises a multi-bit clock timer configured to identify data stored in the data cache that has not been recently accessed.

22. The system of claim 9, wherein the cache manager comprises a clock timer configured to identify data stored in the data cache that has not been recently accessed, wherein the clock timer comprises a plurality of temporal trigger intervals.

23. The system of claim 9, wherein the cache manager is configured to maintain a set of cache tags representing cache capacity allocated to the virtual machine by the cache provisioner, and to adjust the number of cache tags in the maintained set in response to the cache provisioner modifying the cache capacity allocated to the virtual machine.

24. The system of claim 9, wherein the virtual machine comprises one or more of a virtual desktop and a server application.

25. The system of claim 9, wherein the cache provisioner is configured to allocate cache resources to a plurality of virtual machines operating within the hypervisor and control access to data of the virtual machines stored in the data cache.

26. The system of claim 9, wherein the hypervisor comprises a virtualization kernel configured to manage the operation of the virtual machine.

27. A non-transitory computer-readable storage medium comprising instructions for execution by a processor of a computing device, wherein the instructions are configured to cause the computing device to perform operations, comprising:
   provisioning cache storage resources of a cache storage device to respective virtual machines operating within a virtual computing environment within a virtualization kernel of a host computing device;
   informing the virtual machines of the cache storage resources provisioned to the respective virtual machines;
   receiving input/output requests that pertain to a primary storage device from the virtual machines, wherein the received input/output requests are redirected within the respective virtual machines; and
   servicing the received input/output requests by use of the cache storage device, in accordance with the cache storage resources provisioned to the respective virtual machines.

28. A method, comprising:
   maintaining cache tags within a particular virtual machine configured for operation within a virtualization environment of a host computing device, such that the cache tags correspond to cache capacity allocated to the particular virtual machine in a cache storage resource accessible to a plurality of virtual machines operating within the virtualization environment;
   identifying a storage request generated within the particular virtual machine; and redirecting the identified storage request to the cache storage resource in response to determining that data corresponding to the identified storage request has been admitted to the cache storage resource by use of the cache tags maintained within the particular virtual machine.

29. The method of claim 28, wherein the storage request is identified by use of an input/output driver of the particular virtual machine.

30. The method of claim 28, further comprising receiving an indication of the cache capacity allocated to the particular virtual machine from a cache provisioner.

31. The method of claim 30, further comprising modifying the cache tags maintained within the particular virtual machine in response to an indication of a change to the cache capacity allocated to the particular virtual machine by one or more of removing one or more of the cache tags and adding one or more cache tags.

* * * * *

UNITED STATES PATENT AND TRADEMARK OFFICE
CERTIFICATE OF CORRECTION

Page 1 of 1

PATENT NO.         : 8,874,823 B2
APPLICATION NO.    : 13/028149
DATED              : October 28, 2014
INVENTOR(S)        : Joshi et al.

It is certified that error appears in the above-identified patent and that said Letters Patent is hereby corrected as shown below:

Title page, Item (73) Assignee:

Delete "Intellectual Property Holdings 2 LLC", and insert --Intelligent Intellectual Property Holdings 2 LLC--.

Signed and Sealed this
Eighteenth Day of August, 2015

Michelle K. Lee
*Director of the United States Patent and Trademark Office*